United States Patent [19]

De Graauw et al.

[11] 4,159,402

[45] Jun. 26, 1979

[54] MEANS FOR IDENTIFYING SUBSCRIBER LINES

[75] Inventors: Henk A. M. De Graauw, Bramalea; Ronald P. Manning, Ottawa, both of Canada

[73] Assignee: Northern Telecom Limited, Montreal, Canada

[21] Appl. No.: 832,942

[22] Filed: Sep. 13, 1977

[51] Int. Cl.² ............................................. H04B 3/46
[52] U.S. Cl. .......................... 179/175.3 A; 179/90 B; 179/18 FH
[58] Field of Search ................. 179/175.3 A, 175.3 R, 179/175.2 R, 175.2 D, 175, 90 B, 18 FH, 27 DB, 5.5

[56] References Cited

U.S. PATENT DOCUMENTS

| Re. 25,551 | 4/1964 | McAllister | 179/175.2 D |
|---|---|---|---|
| 3,700,830 | 10/1972 | Naylor et al. | 179/175.2 D |
| 3,885,108 | 5/1975 | Zock | 179/90 B |
| 3,898,396 | 8/1975 | Gushue et al. | 179/175.3 A |
| 3,904,830 | 9/1975 | Every et al. | 179/18 FH |
| 3,973,090 | 8/1976 | Miller | 179/175.3 A |

Primary Examiner—Douglas W. Olms
Attorney, Agent, or Firm—Shlesinger, Arkwright, Garvey & Dinsmore

[57] ABSTRACT

A telephone office is provided with a dedicated trunk modified to transmit to subscribers lines connected to the same office the multifrequency tones from an outgoing sender used to identify the calling party. Provision is made for connecting a subscriber's line pair to the dedicated trunk on provision across the pair of a special access code of pulsed or dialled digits. The dedicated trunk is designed to provide the necessary signals to cause the out-going sender to perform its functions. A test set is provided for connection to a subscriber's line pair to dial the special access code. The test set first tests for line conditions before dialling. After dialling the test set detects the information in the multi-frequency tones originating with the outgoing sender. At the telephone office an outgoing sender is preferably modified to send, in addition to the number of the calling party, the line location address of his pair of lines. The test set also detects this information.

29 Claims, 6 Drawing Figures

MEANS FOR IDENTIFYING SUBSCRIBER LINES

This invention relates to test means which may be applied to a subscriber's pair of lines at a telephone office, also sometimes referred to herein as a telephone exchange or "switcher". This invention also relates to improvements in the design of such telephone office, exchange or switcher to cooperate with the test set.

It is an object of this invention to provide a test set designed, when connected across a subscriber's line pair to send a sequence of dialled type digits to the telephone office and thereafter to detect signals from the telephone office providing information as to the subscriber's line pair. The information will identify the listed directory number of the subscriber. In a preferred embodiment the information will also identify the line location information. By line location information is meant the "address" of or the identification of a subscriber's line pair at the main distributing frame associated with a #5 cross bar switching system.

By the terms "dialled type digits" or "dial type signals" we refer to signals which have for practical purposes the form on a pair of wires of signals produced by manual dialling at a conventional telephone subset. The foregoing terms, however, include such signals whether produced manually or automatically and whether originating at a sub set or at a different point as with this invention.

By the terms herein such as "Centrex dialling" or "dialling from a sub-exchange" to reach a conventional telephone office we include the apparatus shown as a Private Branch Exchange (PBX) and the method known as "prefix 9 dialling". In all such arrangements the user of a subscriber's line pair must on receipt of a first dial tone a first digit (almost universally a '9') to get a second dial tone before dialling the digits intended for transmission to a conventional central office.

There is described herein an invention using signalling of digital information from a sender at a telephone office to a test set. Such signalling is described at being in "audio frequency tones". Such tones will for practical purposes almost always take the form of "Multifrequency Pulsing" as defined in the publication Notes on Distance Dialling published by American Telephone and Telegraph under Section 5 "Signalling". For convenience, two paragraphs of this definition are set out below.

The multifrequency pulsing system consists of transmitting and receiving equipment for transferring valid number information over telephone trunks by various combinations of and only two of five frequencies in the voice band. Each combination of two frequencies represents a pulse, and each pulse represents a digit. The pulses are sent over the regular talking channels and, since they are in the voice range, are transmitted as readily as speech. MF receivers insert the pulses and transfer the digital information to control equipment which establishes connections through the switches. MF pulsing is also used to transmit calling number information in CAMA-ANI operation. In this case, the calling number is MF pulsed forward from the originating office to the CAMA office following the forwarding of the called number, whether the called number is transmitted by MF or dial pulsing.

Additional signals are provided by combinations using a sixth frequency. The six frequencies are spaced 200 Hz apart. These six frequencies provide fifteen possible two-frequency combinations. Ten combinations are used for the digits 0 to 9 inclusive, and one each for signals indicating the beginning (KP) and end (ST) of pulsing. The remaining three combinations are used for special signals.

It is an object of this invention to provide a telephone office modified so that on receipt of a predetermined sequence of dialled type signals on a subscriber's line pair to provide to the same subscriber's line pair information, in the form of audio frequency tones information identifying the telephone number (also known as the listed directory number or "LDN") corresponding to the subscriber's line pair. (It should be noted that a telephone office so designed will be a modified office which, before the modification, has automatic number identification (sometimes referred to as "ANI") or equivalent means for providing, responsive to the presence of signals indicative of dialled type digits on a subscriber's line pair, of information to identify the telephone number of the subscriber's line pair from which the call originates.

In accord with the invention the information from the telephone office to the subscriber's line pair and the test set is provided over the conventional connection which is established in the central office for a call between the subscriber at the end of such subscriber's line pair and another subscriber. The use of this conventional connection for the supply of information from the telephone office to the test set is an important feature of the invention.

It is an object of this invention to provide a telephone office, modified as described in the preceding paragraph, to provide, in addition to the telephone number of the subscriber's line pair, the line location information corresponding to the subscriber's line pair. The "line location information" describes the address of the subscriber's line pair on the main distributing frame and is more fully discussed hereafter.

It will be noted that the foregoing objects relate to the test set and a telephone office with modified equipment, where the test set may be connected across a subscriber's line pair and is designed to provide dialled type digits representing a predetermined access code for which the telephone office has been modified, and thereafter the test set is designed to detect information appearing across the same subscriber's line pair in audio frequency tones. This information will identify the telephone number (LDN) corresponding to the subscriber's line pair and will preferably also identify the line location of the subscriber's line pair. The modified telephone office, for its part is designed, on receipt of the special access code, to signal in such audio frequency tones such telephone number (LDN) and preferably the line location information over a conventional connection to the subscriber's line pair from which the special access code. It will be noted, with respect to the prior art, now to be discussed that the information obtained by the operation of the test set is signalled back along a conventional connection to the same subscriber's line pair to which the test set is connected and that the detection by the test set of the audio tone information allows storage or sustained display of the information.

The most relevant outside art known to applicant is represented by a device sold by Cognitronics Corporation, 25 Crescent Street, Stamford, Conn. 06906, and called by them "640/649 Automatic Number Announcer". Applicant does not have full details of the construction of this device. However it appears from a sales brochure that dialling of a number by a craftsmans set connected across either: (a) to announce from a loudspeaker system (over equipment separate from the subscriber's line pair) the LDN of the subscriber's line pair; or (b) to announce (through a special connection in the telephone office) from the craftsman's set the LDN. It will be noted with the Cognitronics device that in alternative (a) the signalling is not back to the craftsman's set and in alternative (b) the path to the craftsman's set is over a special rather than the conventional connection for the subscriber's lines, requiring, in either alternative separate and more expensive equipment than with this invention. It will further be noted with the Cognitronics device that the information signalled to the craftsman (as far as can be determined by us) is not recorded in a manner available to the craftsman on a sustained basis so that he is reduced to ensuring that he hears the audible announcement. It will further be noted that the Cognitronics equipment (so far as we can determine) is not designed to provide other information than the LDN nor is it designed for automatic dialling. The outside art equipment (as far as is known) this is differently designed, is more expensive, does not provide the utility of applicant's device nor is it amendable to provide many of the features available with applicant's construction. It will further be noted that the Cognitronics equipment, although it refers to a craftsman's set for connection to subscriber's line does not appear to provide the automatic dialling features, the signal detection features, the voltage criteria features, the dialling system or the Centrex option described and claimed in connection with the test set of the present invention.

(By reference to the above Cognitronics equipment we do not intend to admit or imply that there are not other significant differences not specified herein nor do we intend to admit or imply that the Cognitronics device was conceived or reduced to practice at an earlier date than this invention).

It is an object of this invention to provide a telephone office modified to provide responsive to a special access code on a subscriber's line pair, for connecting the subscriber's line pair over modified conventional connections to a sender and for causing said sender to send, in audio frequency tones, information as to the telephone number (LDN) corresponding to the subscriber's line pair over the modified conventional connection to such subscriber's line pair.

It is an object of this invention to provide a telephone office modified, as described in the preceeding paragraph to provide signals from said sender over such modified conventional connection identifying the line location information corresponding to the subscriber's line pair.

It is an object of this invention to provide a telephone office modified as described in one of the two previous paragraphs where such office is modified to provide such information in multi-frequency tones.

It is an object of the invention: with a telephone office having means responsive to dial type signals on a subscriber's line pair, to connect the subscriber's line pair to a trunk circuit, the trunk circuit to a sender and to provide the sender with information identifying the telephone number of the subscriber's line, where the sender is designed to provide such information in audio tones on receipt of a signal, to modify a trunk circuit so that, with such trunk circuit, the signal is sent from said sender through such modified trunk to the subscriber's line pair bearing the dial type signals. The modified telephone office is designed so that the modified trunk is connected to a subscriber's line pair when the dialled type signals which appear across the subscriber's line pair represent a predetermined special access code.

It is an object of the invention, with the telephone office as described in the previous paragraph to design the office so that the sender is provided with the information identifying the line location of the subscriber's line pair and so that this information is also provided by the modified sender to the subscriber's line pair over the modified trunk.

It is an object of this invention to provide a test set for connection to a subscriber's line pair which is designed to close a circuit across such pair having dialling means responsive to dial tone across the subscriber's line pair to place on the pair dialled type pulses representing a predetermined sequence of digits and having means for detecting information in audio tone signals on said subscriber's line pair.

It is an object of this invention to provide automatic dialling means designed to present to a conventional telephone office a predetermined sequence of digits regardless of whether an additional initial digit (usually a "9") is required to obtain access from a sub-exchange (often referred as a "Centrex" exchange) to the conventional office.

It is an object of this invention to provide an automatic dialler which operates on receipt of a first dial tone from a connected pair of lines to provide the first of a predetermined sequence dialled type digits. The dialler then determines whether a second dial tone is received within a predetermined interval and either: (a) if second dial tone is received within this interval to provide the remaining dialled type digits in the sequence; or if second dial tone is not received within the said interval to signal a disconnect to the connected lines and then to reconnect to receive a second dial tone, then provide the remaining dialled type digits in the sequence.

It is an object of this invention to provide an automatic dialler which will signal a predetermined sequence of digits to a conventional office whether or not an initial digit is required to obtain connection from a sub-exchange or a "Centrex" exchange to such conventional office.

It is an object of the invention to provide automatic dialling means for connection across a telephone line pair, operable to establish a connection across the pair to obtain dial tone from a connected telephone office and on receipt of dial tone to dial a predetermined sequence of digits, where the establishment of a connection is prevented if the voltage is below a predetermined value.

It is an object of the invention to provide automatic dialling means for connection across a telephone line pair, operable to establish a connection across the pair to obtain dial tone from a connected telephone office and on receipt of dial tone to dial a predetermined sequence of digits, where the establishment of a connection is prevented if the voltage is above a predetermined value.

It is an object of the invention to provide automatic dialling means for connection across a subscriber's line pair, and operable to provide dialled type signals thereon representing a predetermined sequence of digits and to detect thereafter digital signals provided in audio tones on said pair; and a telephone office modified to provide, in response to the presence of such predetermined sequence, and such information in audio tones are over the conventional (although modified) connection established between the subscriber's line pair and the telephone office is response to the dialling of digits on the line pair. The telephone office is designed to provide in such tones information at least identifying the telephone number (LDN) corresponding to the subscriber's line pair and preferably also identifying the line location information corresponding to such pair.

This invention relates to circuitry and equipment and a method for determining, at a subscriber's line pair to a telephone office, the subscriber's number, and preferably the line location address of the subscriber's line pair at the telephone office.

In drawings which illustrate the invention and a preferred embodiment thereof:

FIG. 1 shows schematically the general arrangement of a conventional telephone office, FIG. 2 shows modifications to the general arrangement shown in FIG. 1, FIG. 3 shows modifications to telephone office common equipment and to a sender for use in accord with the invention, FIG. 4 shows the trunk applique circuit for use with the invention, FIG. 5 shows the arrangement for the test set for connection across the subscribers lines, and FIG. 6 shows the operation of the auto dialler.

The features and advantages of the invention as it relates to the telephone office equipment will be discussed in relation to the description of FIGS. 2-4 and the features and advantages of the invention as it relates to the test set will be discussed in relation to the description of FIGS. 5 and 6.

The 'line' location information referred to herein and indicated in relation to bins 14 in FIGS. 1 and 2 refers to the identification of a subscriber's line pair at the main distributing frame associated with a #5 cross bar switching system. Such information, with the abbreviations shown in the drawings, is set out below:

Frame Tens—FT
Frame Units—FV
Vertical Group Tens—VG 10
Vertical Group Units—VG
Horizontal Group—HG
Vertical File—VF Also shown in bins 14 is the type of party, i.e. Tip party, Ring party, (and in certain systems, if provided Tip party two, Ring party two).

Figure 1:
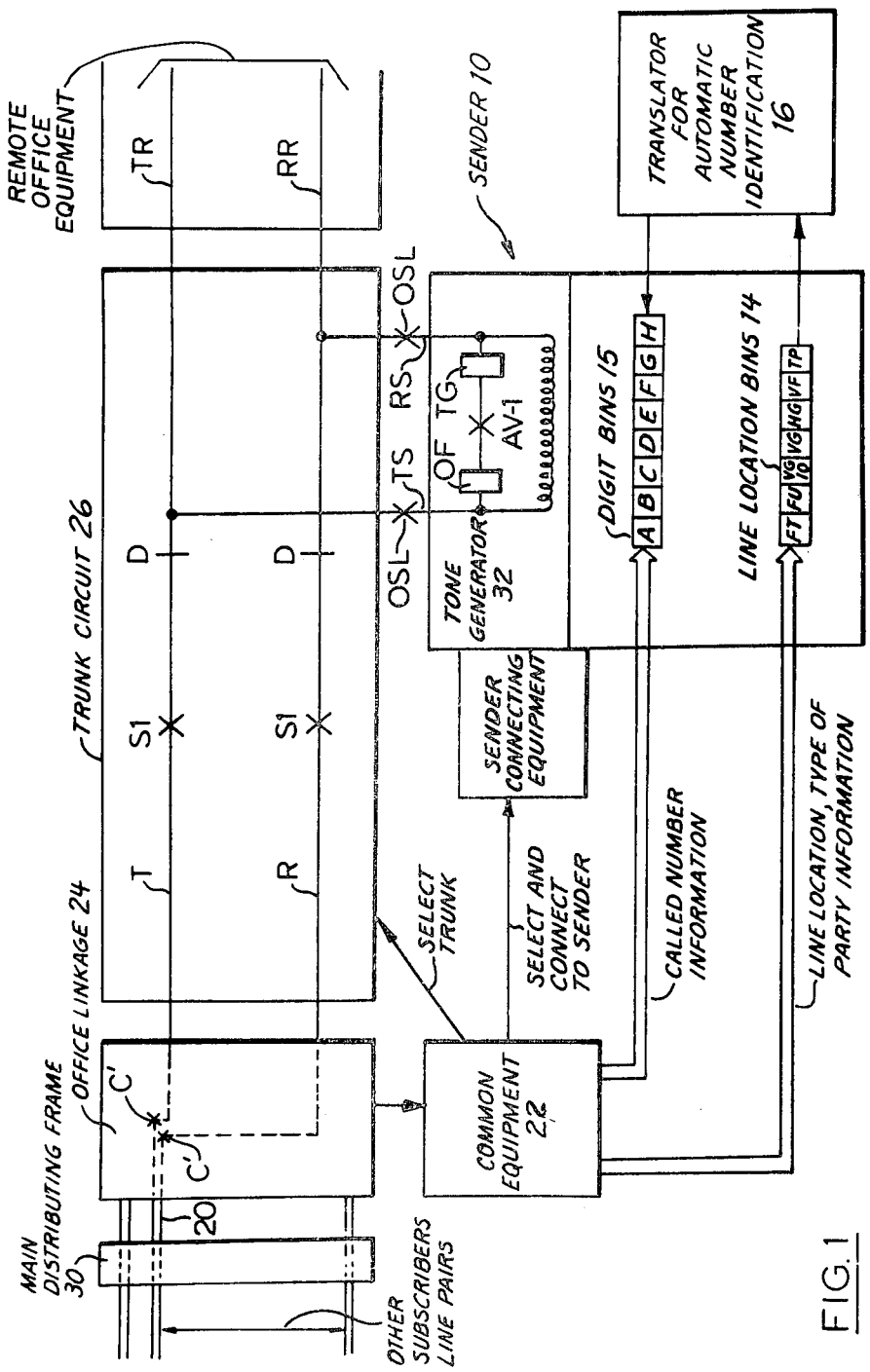
FIG. 1 shows existing circuitry in a telephone switching office.

FIG. 1 shows the existing equipment at and surrounding a telephone switching office with which the invention may be used, typically a #5 cross-bar telephone system described in U.S. Pat. No. 2,585,904 issued Feb. 19, 1952 to A. J. Busch. For use in accord with the invention this will be an office adapted to signal other switching offices in pairs of audio frequency tones usually known as MF 'multi-frequency' tones from a sender 10. It will also be equipped to provide through common equipment 22 the line address of the calling party to line location bins 14 of sender 10 and from bins 14 to a converter (often known as a "translator") 16 for automatic number identification (ANI). This converter 16, often referred to as "ANI equipment", is designed for and used for converting the line address into the calling party's telephone number sometimes called the listed directory number or 'LDN'. Seizure of a subscriber's pair of lines 20 by a subscriber (by closing the subscriber's hook switch (not shown)) achieves connection through the main distribution frame 30 to the office linkage 24 of the office. When dial tone is returned to the subscriber he dials the numbers to complete his call, which, in the example it is desired to use, includes initial digits to achieve selection of a trunk circuit 26 by the common equipment 22. The term "common equipment" is used to include the equipment such as: completing marker for selecting trunk circuits and outgoing senders to send the tones therealong and originating senders for originally recording the digits dialled by the subscribed; which equipment is common to both the subscriber's side and the trunk side of the office linkage. In a conventional office the seizure of a trunk circuit 26 is used for connection to a remote office. The common equipment and its common markers are designed, in response to the subscriber's dailling, to select an outgoing sender 10 and a trunk circuit 26 and to connect the selected outgoing sender 10 to the selected trunk circuit 26. The common equipment 22 also acts to connect the selected trunk circuit 26 to the subscriber's line pair 20 (over the contacts D). The common equipment 22 provides to the line locations bins 14 of the outgoing sender 10, the line address on the main distribution frame 30 of the subscriber's lines, i.e. the numbers of the line link, vertical group, horizontal group, vertical file. The common equipment is also designed in some cases to provide to the line location bins 14 particulars about the type of party. The common equipment 22 provides to the digit bins 15 of the sender, the dialled digits received from the subscriber over the subscriber's line pair. The common equipment 22 in accord with normal practice, is equipped to delete any of the dialled digits from those supplied to the outgoing sender 10, which are not required for transmission along the trunk circuit 26 to the remote office. Means are also provided in the cross-bar operation and in sender 10 for deleting selected digits from the digit bins 15 to avoid their transmission when this is not desired; and means are also provided for clearing the digits from the digit bins. The outgoing sender 10 is designed, on receipt of a signal along its trunk connection, to send, from its tone generator 32, signals in audio frequency tones which are within the usual range for telephone audio signalling i.e. between 200 and 300 Hz. These signals represent the information contained in the sender digit bins 15 at the time the signal is received from the trunk. Conventionally the sender sends (in conventional multi-frequency signalling) pairs of frequencies selected from 700 Hz, 900 Hz, 1100 Hz, 1300 Hz, 1500 Hz and 1700 Hz with pairs selected from the lower 5 of these frequencies to represent the digits 0-9.

The outgoing sender 10 is thus designed, on receipt of a signal from the trunk circuit connected thereto, to provide the information contained in digit bins 15, in tone pairs, to the trunk. FIG. 1 also shows the contacts D conventionally operated by the sender to temporarily disconnect the subscriber during tone transmission from sender 10 to trunk circuit 26. The contacts OSL are shown to indicate the closure of the connection of sender 10 lines TS and RS to the lines T and R of trunk circuit 26 for transmission and to symbolize by the open condition of contacts OSL the disconnection of the outgoing sender from the trunk before and after performing its functions. The relays OF, TG and contacts AV are shown connected in series across the TS and RS lines of the outgoing sender 10. The TS and RS lines of the sender from its standard path for outpulsing digits in the form of dual tones and lines TS and RS connect respectively to lines T and R of the trunk over the OSL contacts. The contacts AV-1 are contacts of a relay. This relay, not shown, which is part of the conventional design of the outgoing sender 10, is operated under the control of the completing marker when the completing marker has determined that it has supplied to the sender 10 the information comprising the line address, the type of call and the called number. The TG relay is designed to sense, in order to cause certain normal sender operation, that there is a connection established across its TS and RS lines, e.g. because of a connection across lines TR and RR connected to the sender over lines T and R. The OF relay is designed to sense, in order to cause certain normal sender operations, the occurrence of a reverse polarity across the TS and RS leads. Such reverse polarity is sent from the distant office lines TR, RR over lines T, R to signal outgoing sender 10 to signal, in tone pairs, the information contained in its digit bins (The conventional operation of the sender in this regard is described more fully in connection with the description of the invention to follow).

It is worthwhile to note, with respect to the description of the invention to follow, that the line location bins 14 do not necessarily contain information in the same format as the telephone number digit bins 15 whose information is transmitted in tone pairs. In other words, the information in the line location bins 14 would have to be converted to a different format if it were to be stored in the digit bins 15 for transmission. Such conversion which would be of the same numbers to a different format should not be confused with the conversion, in conventional offices, of the information in the line location bins to different information i.e. to the listed directory number of the subscriber. In the conventional telephone office, with the called number or the relevant part thereof stored in the digit bins 15, a connection is established TS, RS/T, R/TR, RR to a storage device for these digits in the remote office. On connection of such remote storage device, a signal is sent from the remote office towards the trunk circuit 26 over the above listed lines, to cause the outgoing sender 10 to transmit the called number digits in audio frequency tone pairs. This signal is customarily a short reversal of the polarity across the line pairs TR, RR/T, R/TS, RS to the sender known as a "wink" reversal. Switching is provided so that, during the transmission of the audio tone signals from the outgoing sender 10 to the distant end the connection between the trunk circuit 26 and the originating subscriber's line pair is temporarily broken at the contacts D to avoid the calling party hearing the transmitted tones and to avoid unnecessary attrition of the power of the tones. After transmission by the sender 10 of the relevant digits of the called number, a second signal is sent from the remote office over the trunk circuit 26 to the outgoing sender 10 to cause it to provide the phone number (i.e listed directory number (LDN) of the called party. Such second signal is usually in the form of a reversal of polarity, sufficiently longer than the wink reversal, described previously, to allow the outgoing sender 10 to distinguish the two signals. The second longer signal is sometimes known as a "hard reversal". Customarily the second signal is used in outgoing sender 10 to cause transmission of the information in the line information bins 14 to the Convertor which supplies the calling telephone number (LDN) to the sender digit bins 15, which number is then sent out to the trunk circuit 26 in tone pairs. Contacts D are also open during this transmission. FIG. 1 also shows Contacts C' in the office linkage symbolizing the complex connections achieved therethrough from the subscriber's line pair 20 under consideration, on the one hand, and the selected trunk circuit 26 on the other hand. The relay contacts S1 indicate the connection across the Tip and Ring lines T and R of the trunk between the office linkage 24 on the one hand and the remote office and outgoing sender 10 on the other hand.

Figure 2:
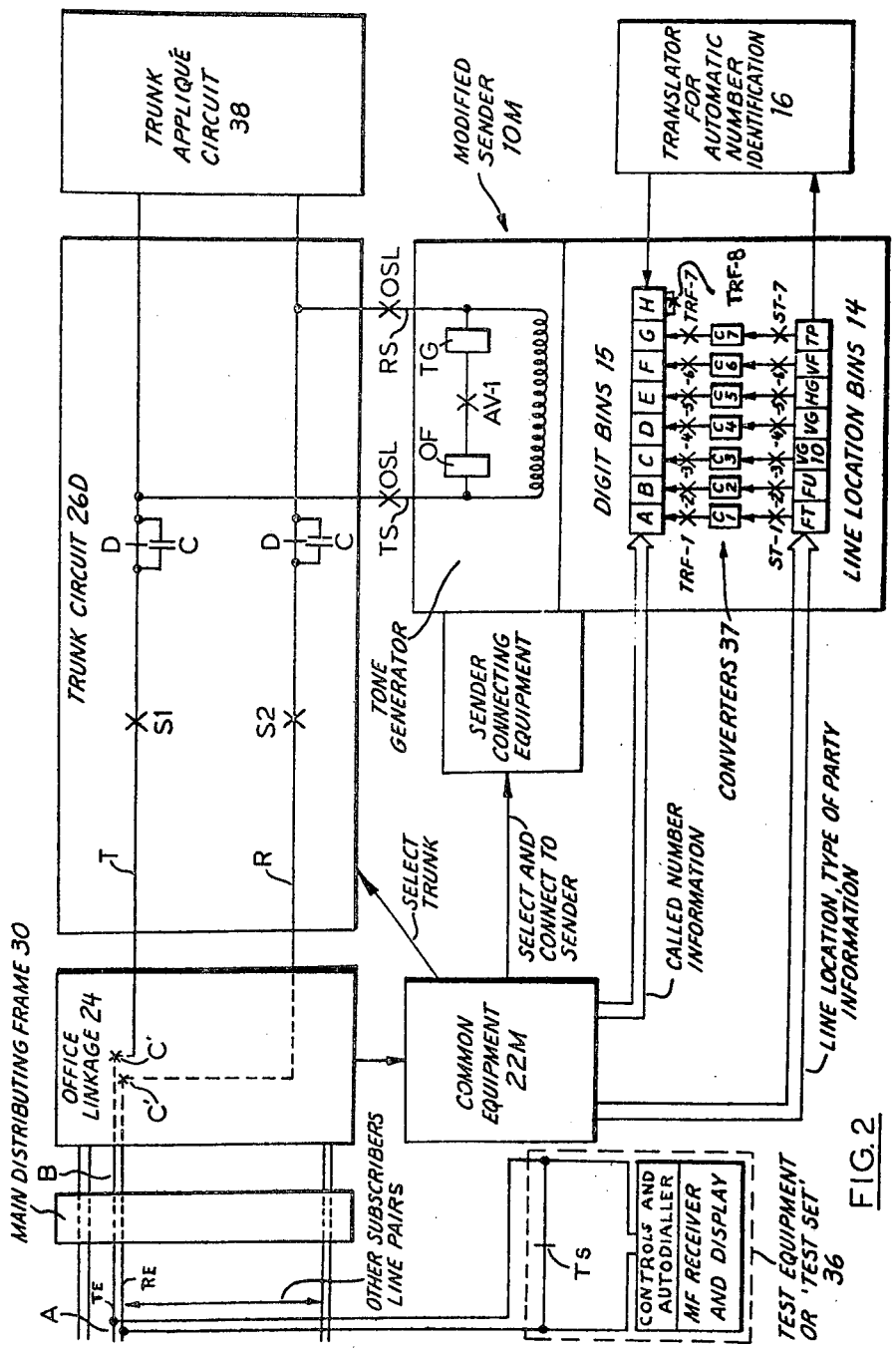
FIG. 2 shows such circuitry modified to provide to a test set the signals required.

In FIG. 2 is shown the modification of the circuitry of FIG. 1 in accord with the invention in order to provide information as to the line equipment address and as to the calling number (LDN) corresponding to a subscriber's line pair to test equipment 36 connected across that subscriber's line pair 20. The test equipment 36 may be connected across a subscriber line pair 20, at any position, such as A or B shown in the drawing, where such subscriber pair retains its unique character and does not share a common path in the office linkage 24 with other lines. Preferably, however, the test equipment 36 is designed to operate more efficiently close to the central office equipment. It is important to note, however, that the test equipment 36, although shown as connected near or in the immediate vicinity of the telephone office equipment, may also be connected to the subscriber's line pair remote from the telephone office equipment e.g. adjacent the subscriber's sub-set or geographically intermediate the sub-set and the office. The test equipment 36 is particularly valuable where it is connected at position A, for in determining at A the corresponding calling party's number (LDN) the user of the test equipment at point A is able to determine (without an assistant on the other side of the main distributing frame) whether the connection across the main distributing frame is correct. The test equipment is designed to dial or allow dialling of a special code which is preferably a 3 or 4 digit number which is otherwise unused in the office linkage. The dialling by test equipment 36, of such digits, is preferably performed as described in connection with FIG. 6. As there described, the pulsing to dial the digits is performed by breaks in the connection through a solid state switch TS connected across the subscriber's line pair being inspected. Switch TS is shown schematically in FIG. 2. In addition to the conventional outgoing senders described in connection with FIG. 1 there is provided in FIG. 2 a modified outgoing sender 10M, having in addition to the features described in connection with the outgoing senders of FIG. 1, a plurality of convertors 37 each respectively connecting a line address bin 14 to a digit bin 15. In addition to the conventional trunk circuits provided, there is provided, in the circuit of FIG. 2, a dedicated (and modified trunk circuit 26D with condensers C bypassing its D relay contacts to transmit the audio frequency tones therepast when the D relay contacts are open. By 'dedicated' herein is meant used only for the stated purpose and not available for other or general usage. The dedicated trunk circuit 26D is not arranged for connection to a distant office, as would be a normal trunk circuit but instead is connected to a trunk applique circuit 38 which simulates distant office functions in transmitting the reverse polarity signals to the outgoing sender to cause transmission in tone pairs of the information in its digit bins 15. The common equipment 22M of FIG. 2 is designed, on receipt of the special access code provided in the form of dialled digits by test equipment 36, to connect a specially designed sender 10M to a dedicated trunk circuit 26D and to connect the dedicated trunk circuit 26D to the subscriber's line pair on which the access code was dialled. The common equipment 22M is also preferably designed to prevent all the digits from the 3 or 4 number access code from being transmitted from the digit bins 15 of the outgoing sender 10M to which such digits would normally be supplied. The common equipment 22M supplies (through its completing marker) as in the conventional arrangement of FIG. 1, the line location information and type of party (i.e. tip or ring), to the line location bins of the outgoing sender 10D.

The common equipment 22M for use with the invention is provided with means, responsive to the connection of the modified sender 10M, to initiate a signal which causes the information in the line location bins 14 to be converted at converters 37 and supplied directly to the digit bins 15. It will be noted that, in the modified sender 10M, the line location information supplied by bins 14 to bins 15 through convertors 37 is also, at the same time, retained in the line location bins 14 for the usual purpose of obtaining the calling party's number. With the line location information loaded in the digit bins 15, a short or wink reversal of polarity is provided from trunk applique circuit 38 on trunk lines T & R (and appearing on lines TS & RS) (the 'first signal' referred to in connection with FIG. 1), causes the line location information in bins 15 to be transmitted in tone pairs from the sender 10M to the dedicated trunk circuit 26D and over the condensers C (bypassing contacts D which are then open) to the subscriber's line pair TE, RE where the test instrument applied the dialling. Thereafter, a long reversal of polarity provided on trunk lines T and R and lines TS, RS from trunk applique circuit 38 causes, in accord with normal outgoing sender operation, (1) the conversion of the line address information in line address bins 14 into the calling party's telephone number (LDN), (2) the supply of the LDN to the sender digit bins 15 and (3) causes the modified outgoing sender 10M (in accord with normal sender operation) to supply through its tone generator, the calling number (LDN) information, then stored in the digit bins 15, to the dedicated trunk 26D and over capacitors C to the test set. The set instrument, as hereinafter described, in designed to decode the tones received and to display the line location information, first received, and the calling telephone number (LDN) corresponding to the subscriber's line.

In a simpler form of the invention (and with simpler circuitry than that shown in FIG. 2) the test instrument is designed to display only the calling number (LDN). This simpler instrument may be used with cross bar offices and is particularly suitable for a step-by-step office where the line address or line location information does not exist or is not available. IN the simpler alternative, the dedicated trunk circuit 26D and trunk applique circuit 38, as shown in FIG. 2 are still used to provide the signal from the sender bypassing the D relays to the test instrument. However, since there is no line location information to convert, the outgoing sender 10 may be the crossbar type or step-by-step ANI outpulser for the office. The identification of the calling number in a step-by-step office and its mode of ANI operation with sender 10 are well known to those skilled in the art.

Thus, in the simpler version of the invention, there is provided the arrangement of FIG. 1, modified by providing, instead of the trunk circuit 26 shown in FIG. 1, a dedicated trunk 26D as shown in FIG. 2 with condensers C across the trunk D contacts and with a trunk applique circuit 38 at the end of the dedicated trunk 26D. The outgoing sender 10 may be of conventional design, selected by common equipment 22 in the conventional manner. In such arrangement the common equipment 22, in response to the dialling of a special code at the test set across a subscriber's pair of lines, connects the dedicated trunk 26D to the subscriber's line pair bridged by the test set, and to whatever standard sender 10 is selected by the common equipment 22, thereafter the trunk applique 38 first sends the short or wink reversal or 'first signal' to the sender 10 but the sender either has no information to send in response to this or the test set is designed to ignore anything transmitted. The trunk applique 38 next sends the hard reversal. This results in tone transmission by the sender 10 of the calling number (LDN) corresponding to the subscriber's lines pair for display at the test set. The first signal or "wink" reversal does not, as will be noted, serve any direct function in conveying information to the test set. It is found preferable to include the wink reversal in the operation, however, because the design of the standard outgoing sender causes it to operate on the basis of reception of the wink reversal before the hard reversal. Thus, if in this embodiment, a trunk applique were provided which provided only the hard reversal, extensive redesign of the sender would be required.

With reference to the signalling in audio tones from the telephone office to the test set, reference is made to the signalling of the telephone number (LDN) corresponding to the subscriber's line pair and/or the line location information. It should be noted that it may not be necessary to supply either the entire LDN or line location information in order to have it properly identified. For example, at a telephone office or in a part thereof, where all phone numbers commence with the digits 481- the test set operator will know this and the telephone office need only signal the remaining digits of the telephone number to completely identify it. Similarly there will be situations and applications where only part of the line location information is required to completely identify it at the test set. Such applications are intended to be within the scope of the application and the appended claims.

In the detailed circuit drawings to follow, the symbol X on a connection indicates a relay contact which is open when the relay is released and closed when the relay is operated. The symbol of a straight line perpendicular to the connection indicates a relay contact which is closed when the relay is released and open when the relay is operated. A rectangle on a connection marked (say) QR indicates the relay, and the contacts of this relay, wherever they are shown in the drawings are marked QR-1, QR-2, etc.

Figure 3:
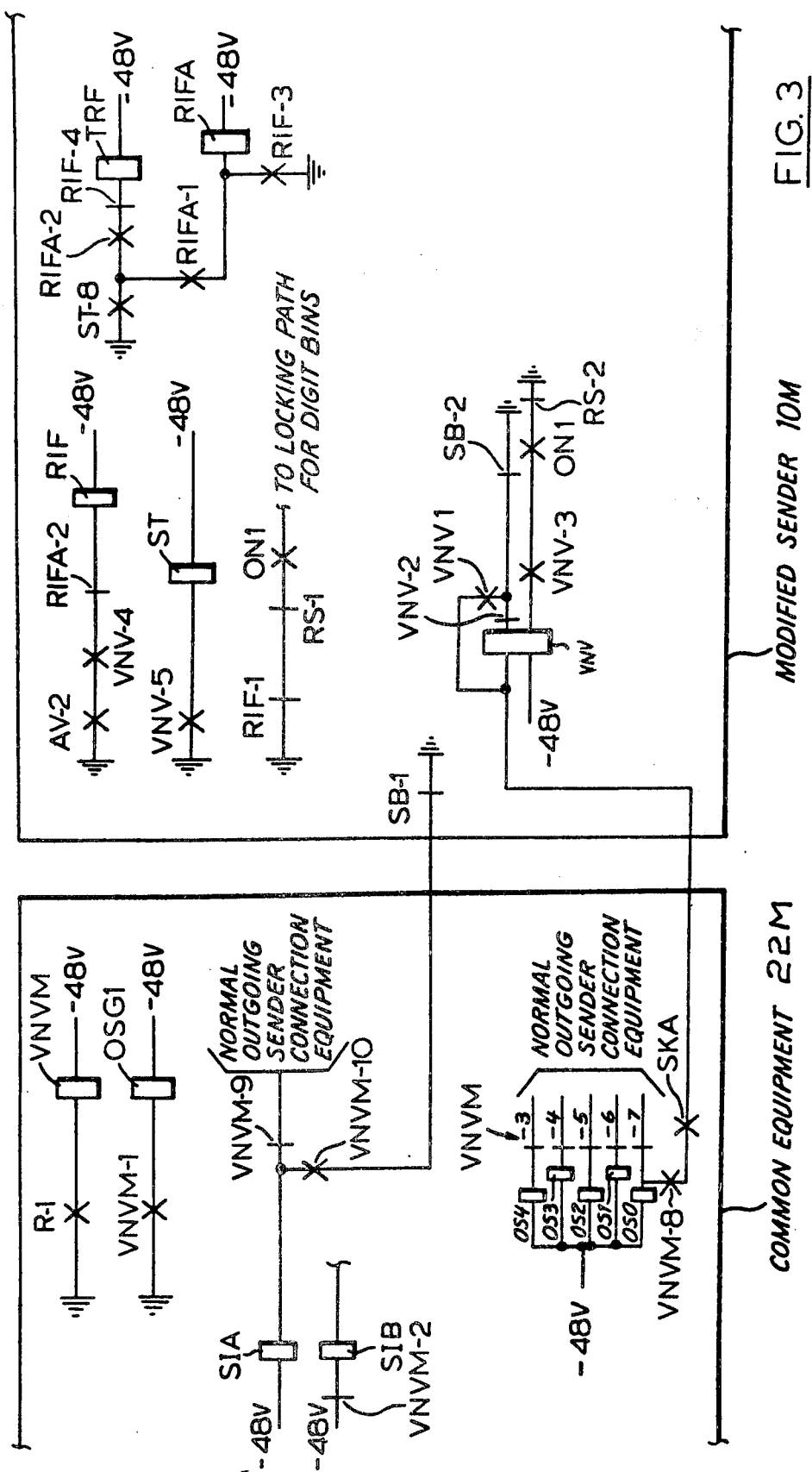
FIG. 3 shows modifications to the common equipment of the existing circuitry for use with the invention.
Figure 4:
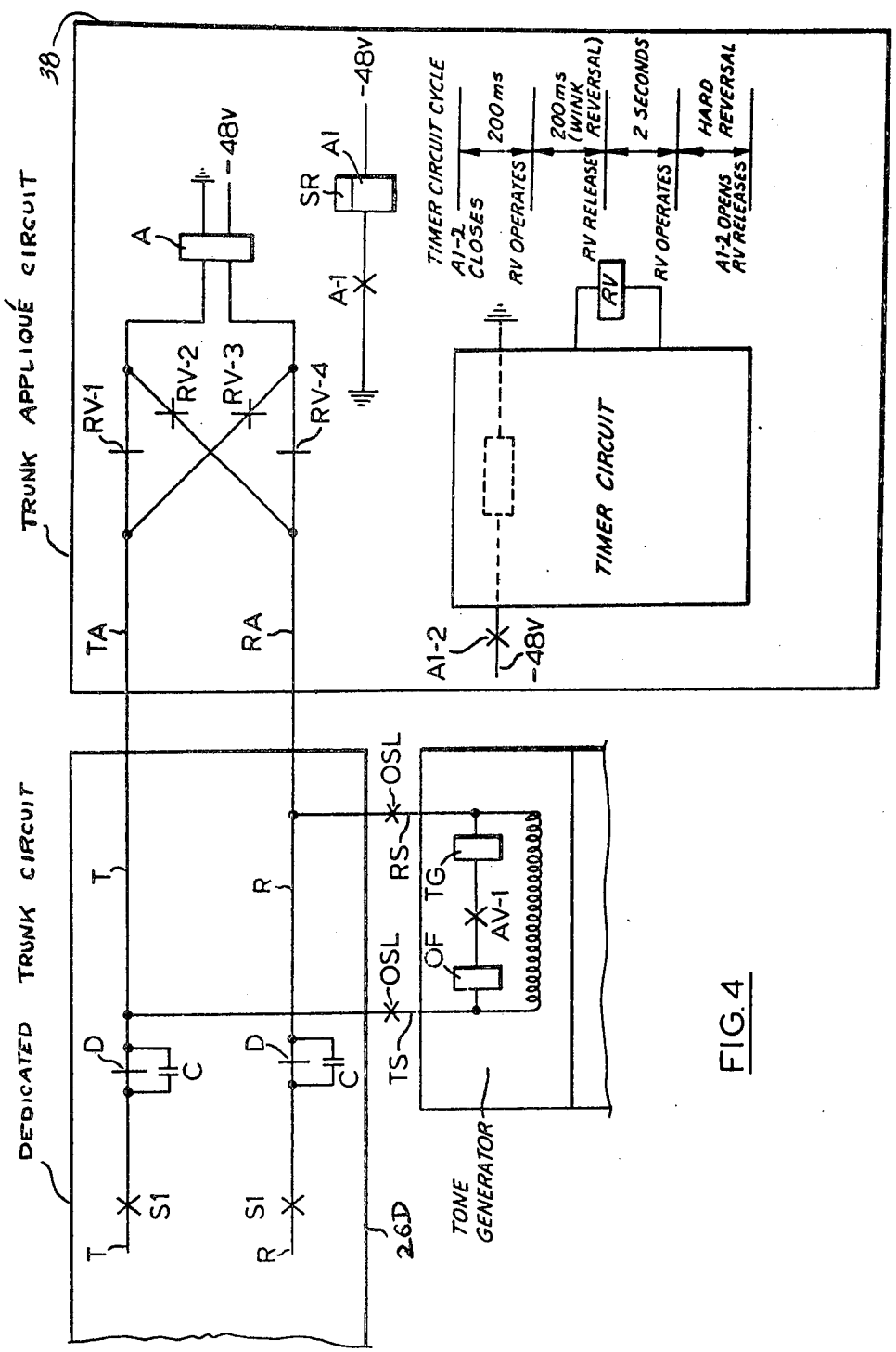
FIG. 4 shows the trunk applique circuit for a dedicated trunk.

FIGS. 3 and 4 described hereafter show specific circuitry details of the embodiment of FIG. 2 where the modified sender 10M of FIG. 2 sends both line location information and calling number to the test set.

In FIG. 3 are indicated, to some extent schematically, the modification 22M to the conventional common equipment 22 (and particularly the completing marker thereof) to achieve connection to a modified sender 10M, a portion of the circuitry of which is also shown in FIG. 3. The completing marker is, as is well known, that portion of the common equipment 22 which selects and connects a trunk circuit 26 (here it will select dedicated trunk 26D and a sender 10 (here modified sender 10M) and connects the trunk circuit to the subscriber line pair. In FIG. 3 the left hand side shows modifications to a completing marker circuit and the right hand side show modifications to a conventional sender. The conventional circuitry of both marker circuit and sender is omitted. The upper portion of the completing marker circuit modifications shows a relay VNVM connected to be operated by closure of the contacts R-1. The relay R (not shown) commonly called a "Route" relay is connected by techniques well known to those skilled in the art to be operated by the completing marker responsive to the marker'reception of the special access code dialled at the test set. Operation of the Route relay R closes contacts R-1 operating relay VNVM. The relay OSG1 immediately below is conventionally part of the marker and causes a sender group to be selected from the sender groups available. It will be understood that the outgoing sender group corresponding to the relay OSG1 includes the dedicated outgoing sender. The contacts VNVM-1 in series therewith ensure that relay OSG1 is not operated until VNVM has operated, to ensure that the proper group and the proper sub-group of senders and the proper sender in the sub-group are selected to ensure seizure of the modified sender 10M.

The series of relays shown, S1A, S1B function in the completing marker to indicate and render available to the marker sub-groups (of the group selected) of outgoing senders, having in the sub-group an outgoing sender "idle" i.e. available for use. It is assumed for this embodiment that the sub-group of outgoing senders containing the modified outgoing sender corresponds to relay S1A. The circuits for the relays S1B, (corresponding to the other sender sub-group) contain respectively the normally closed contacts VNVM-2 of relay VNVM, so that when relay VNVM is operated by the special code, all relay sub-groups are eliminated but those containing the modified outgoing sender 10M. In the operate circuit for relay S1S contacts VNVM-9 open, when relay VNVM operates, to disconnect the relay S1A from its normal operate path which would be used in usual sender selection, while closure of contacts VNVM-10 completes an alternative operate path for relay S1A over contacts SB-1 in the modified outgoing sender. The contacts SB-1 belong to a standard relay in the sender which relay operates when the sender is seized. Thus if the modified sender is already in use for other purposes before the access code was dialled, the contacts SB-1 are open preventing an attempt by the completing marker of equipment 22M to operate the modified outgoing sender circuit. In such event the operation of the circuitry in accord with the invention would have to be delayed until such a modified sender 10M was available.

The description elsewhere however proceeds on the assumption that the modified outgoing sender is available and contacts SB-1 are closed and the S1A operates to select the correct sender sub-group.

VNVM operated provides in the completing marker contacts necessary to ensure that the marker picks the modified outgoing sender out of the senders in the sub-group. In particular, contacts VNVM-3, -4, -5, -6 open on operation of relay VNVM to prevent the selection of outgoing senders corresponding to (and normally, in the marker, selected by) relays OS4, OS3, OS2 and OS1, by opening the respective connections to energize these relays. Contacts VNVM-7 also operate to interrupt the normal connection to operate relay OSO (corresponding to the modified sender 10M) but at the same time contacts VNVM-8 close to complete a connection for relay OSO, over contacts VNVM-8, contacts SKA, relay VNV in the modified sender and contacts VNV-2 and SB-2. In this application, as in the standard operating technique of a telephone office, an operate path for a relay is from ground (indicated by the conventional symbol) to −48 volts indicated by "−48". If the relay rectangle is bridged by two pair of wires instead of one a double winding is indicated. Contacts SKA close in the normal function of the outgoing marker, consequent upon the operation of relay S1A to select the sub-group containing the modified sender. Contacts SKA thus ensure that relay OSO and relay VNV in the outgoing sender do not operate until after S1A has operated to select the correct sub-group. When contacts SKA are closed and VNVM is operated, the completion of the circuit through relays OSO and VNV causes VNV to operate. Contacts SB-2 are similar to contacts SB-1 and only operate when the sender has been previously engaged which is not the case in this example. VNV is designed so that OSO it wil not operate with VNV in series. However VNV operated locks with its other winding over its contacts VNV-3, ON1 and RS-2 then closed.

The relay whose contacts RS-1 and RS-2 are shown in FIG. 3 is part of the normal circuitry of the outgoing sender and the relay is released (RS-1 & RS-2 closed) when it is desired to retain informaton in digit bins 15. This relay operated opens RS-1, RS-2 when it is desired to release the information in the digit bins.

The contacts ON1 are closed during the normal operation of the sender. Contacts ON1 only open when sender functions as described here (or during the normal operations of the sender) have been completed. VNV operated also closes contacts VNV-1 to bypass that coil of relay VNV which is in series with relay OSO and allowing relay OSO to operate. OSO operated in the completing marker initiates the standard functions of supply of information as to the line location etc. to the outgoing sender. The circuitry just described relating to relays OSO and VNV ensures that OSO does not operate to cause transfer of information to the modified outgoing sender until VNV has operated.

Operation of relay VNV closes contacts VNV-4 in the operate path of relay RIF. Also in the operate path of relay RIF are the contacts AV-2 of a relay AV (the relay AV being not itself shown). The relay AV is part of the conventional design of the completing marker and sender and is operated under the control of the completing marker when the marker has determined that it has supplied to the line location bins 14 of the outgoing sender (in this case the modified sender) the information comprising: the line address, and optionally the type of call and the called number information. In the circuitry of the invention the called number is discarded by a combination of the inventive circuitry and the standard operation of a sender in a crossbar system. When AV and VNV have operated RIF operates. Thus the foregoing information is transferred from the completing marker to the outgoing sender between the operation of relay VNV and the operation of relay R1F. Operation of relay R1F opens contacts R1F-1 opening the locking path to the digit bins 15. This locking path is part of the standard connections of an outgoing sender and breakage of this path operates to clear the digit bins 15 of any previously stored information. This has the effect (inter alia) of clearing the digit bins of any part of the special code which was dialled at the test set 36 which was also supplied by the completing marker to the outgoing sender.

Operation of relay VNV (FIG. 3) closes contacts VNV-5 operating relay ST. Operation of relay ST operates (see the schematic representation of FIG. 2) relay contacts ST-1 to ST-7 inclusive to connect the line location bins 14 to the respective convertors C1-C7. Operation of relay R1F also operates at contacts R1F-3 relay R1FA which with ST relay operated locks over contacts R1F-1 and ST-8. Relay R1FA operated releases relay R1F at R1F-2. Release of R1F restores holding ground for the digit bins. Thus the operation and release of relay R1F has cleared the digit bins 15 of any unwanted information such as any part of the special access code. Operation of ST relay and relay R1FA and release of relay R1F completes an operate path for relay TRF over ST-8, R1FA-2 and R1F-4. Relay TRF operated closes (see FIG. 2) contacts TRP-1 to TRF-7, inclusive, to supply the information stored in the line address bins, and converted in the convertors 37 C1 to C7 into digit bins A-G in the correct format for use therein. As noted there is in the normal construction of the sender an H digit bin (shown in FIG. 2) designed to provide a selected single ground signal used within the sender itself to signal and sending of the last digit. There is thus no convertor required for the H digit bin but the H bin is readied on operation of the TRF relay by closure of contacts TRF-8. It will be noted that the line location information also remains in the line address bins 14, as well as now being located in the digit bins 15.

The operation of the trunk applique circuit is shown in FIG. 4. Also shown in FIG. 4 is the connection from the trunk applique circuit through the trunk to the relays OF and TG in series with the contacts AV-1 of the relay AV. The relay AV which is not itself shown in the drawings is part of the conventional design of the sender and is operated under the control of the completing marker in the common equipment when the marker has determined that it has supplied to the modified sender the information comprising: the line address, the type of party and the called number. The operation of the completing marker is such that the dedicated trunk circuit 26D has been connected to the sender and to the subscriber's line pair, as indicated in FIGS. 4 and 2, by the time that AV operates. As shown in FIG. 4 the operation of relay AV closes the contacts AV-1 and completes a loop (i.e. circuit) from: ground, over one winding of relay A, contacts RV-1, contacts OSL, (closed when the sender 10M is connected to trunk 26D) relay OF, contacts AV-1, relay TG contacts OSL contacts RV-4, the other winding of relay A to −48 volts. This operates relay A closing its contacts A-1 to operate relay A1. A1 operated closes its contacts A1-2. Relay A1 is designed to be of the slow release type. Thus if relay A tends to "flick" during short interruptions in the current to relay A during operation or reoperation of contacts RV-1, RV-2, RV-3, RV-4, relay A1 stays operated over these "flicks" of relay A. Operation of relay A1 and closure of contacts A1-2 initiates the timer operation.

The timer, which may be of any design and hard wired or solid state, generates the cycle of operation of relay TM set out below. The circuitry of the timer is not set out because there are many alternative forms of timer for providing such cycle, all well known to those skilled in the art.

The timer circuit cycle, initiated by operation provides the following sequence (also shown on FIG. 4), it being understood that relay RV is released when the timer is not actuated. When contacts A1-2 close the timer is actuated. RV is maintained released for 200 milliseconds to ensure that the sender functions to prepare the sender to operate are completed. After this 200 milliseconds interval RV is operated for 200 milliseconds and then released. The operation of RV closes contacts RV-2 and RV-3 and opens contacts RV-1 and RV-4, reversing the polarity across lines (TA, RA), (T,R,), (TS,RS) for 200 milliseconds and providing the wink reversal to the sender. The wink reversal causes sender 10M in its normal mode of operation, to send (after the end of the wink reversal, with normal polarity across T & R due to the release of relay RV) the line address digits from bin 15 over (TS, RS), (T & R) over condensers C, to the subscriber's line pair and the test set 36. The timer circuitry maintains RV released for 2 seconds during the pulsing ofthe line address digits. After the sender outpulses the line location address digits it operates, as part of its normal operation, the relay which opens contacts RS-1, RS-2 (FIG. 3). Contacts RS-1 opened (as in the normal operation of the sender) clear the digit bins 15 so that bins 15 are ready to receive the calling numer (LDN) information. Contacts RS-2, in the modified sender circuitry release relay VNV to remove through release of relay ST the converter 37 input to the digit bins. After the 2 second RV release the timer operates relay RV for an extended period. This again reverses the polarity of the TA and RA, T & R lines and constitutes the 'hard reversal', which in the normal operation of the sender causes the line location information in bins 14 to be converted at convertor 16 into the calling number (LDN) corresponding to the subscriber's line pair bridged by the test set; supplied to bins 15 and pulsed out by the sender. When the sender has done this it disconnects itself at OSL and releases contacts D (which latter is not relevant to the purposes of the invention). When the operator of the test set disconnects, the loop is opened at the switch TS, contacts S1 are opened in accord with the normal operation of the switching equipment. Relay A releases and after a slow release A1 releases, resets the timing circuit which releases RV.

In summary of the overall operation: when the operator of the test set 36 connects across a subscriber's line pair, and dials a special code (by means of 'breaks' in switch TS) the completing marker in the common equipment connects the subscriber's line pair TE-RE to a dedicated trunk circuit 26D with a special trunk applique circuit 38 attached and operates VNVM relay to ensure that a modified rather than a conventional outgoing sender is selected. When the modified sender 10M is selected it is connected to the dedicated trunk 26D. The marker then, in accord with its normal operation, supplies to the modified sender the line location information and perhaps the type of party to its line location bins 14. Selection of the modified sender 10M causes operation of the VNV relay therein. The VNV relay, added in the modifications to the existing circuitry, acts to clear the digit bins 15 of any information which they already contain, then causes conversion through convertor 37 of the information in the line location bins 14 into a form suitable for storing in the digit bins 15 and stores the line location information and type of party therein (it also remains stored in the line location bins 14). When the sender 10M is ready to transmit the information in the digit bins, it opens the D relay contacts which in a conventional trunk would disconnect the subscriber's line pair from the trunk-sender connection. However in the modified trunk circuit 26D, condensers shunt the D relay contacts for audio tones. When the completing marker in the common equipment 22M has determined that the modified sender 10M has received the line address and type of party, the called number which is the access code (and later discarded by the sender on operation of relay VNV after the marker has released), the marker closes the contacts AV-1 in the modified sender which closes a loop (circuit) in the trunk applique circuit attached to the modified trunk to initiate a timed cycle. The timed cycle provides first a short reversal of the polarity across the respectively connected lines TA, RA/T, R/TS, RS to the sender 10M causing it to send the line location information in its digit bins 15 over TS, RS and T,R to the subscriber's lines and the test set 36 and later a long reversal of the T,R, TS,RS polarity to cause (in accord with normal sender operation) conversion at translator 16 of the line location information into the number (LDN) corresponding to the subscriber's line pair, the supply of this number to the digit bins 15 and the supply of this information over TS, RS and T,R in audio tones to the test set 36.

It should be noted that the special equipment of the modified sender can also be ignored when it is used as an ordinary sender. However the modification of the sender may be permanently wired and the modified sender dedicated to the purposes of the invention.

If the invention is used to supply only the number of the subscriber's line pair the dedicated trunk and trunk applique are still used but a conventional rather than a modified sender may be used. The special access code is not used by the sender or is ignored. The line location information is supplied as is usual to the line location bins 14. The wink reversal from the trunk applique circuit does not, in this application, result in the transmission of information from the sender but is used because in the normal operation of the sender, it is designed to receive this before the long reversal. The long reversal from the trunk applique circuit results in the conversion at translator 16 of the line location information in the line location bins 14 into the calling party number (LDN) in the digit bins 15 and the transmission of this information to the test set.

The test set 36, shown as a block in FIG. 2, will now be described with principal reference to FIGS. 5 and 6.

Figure 5:
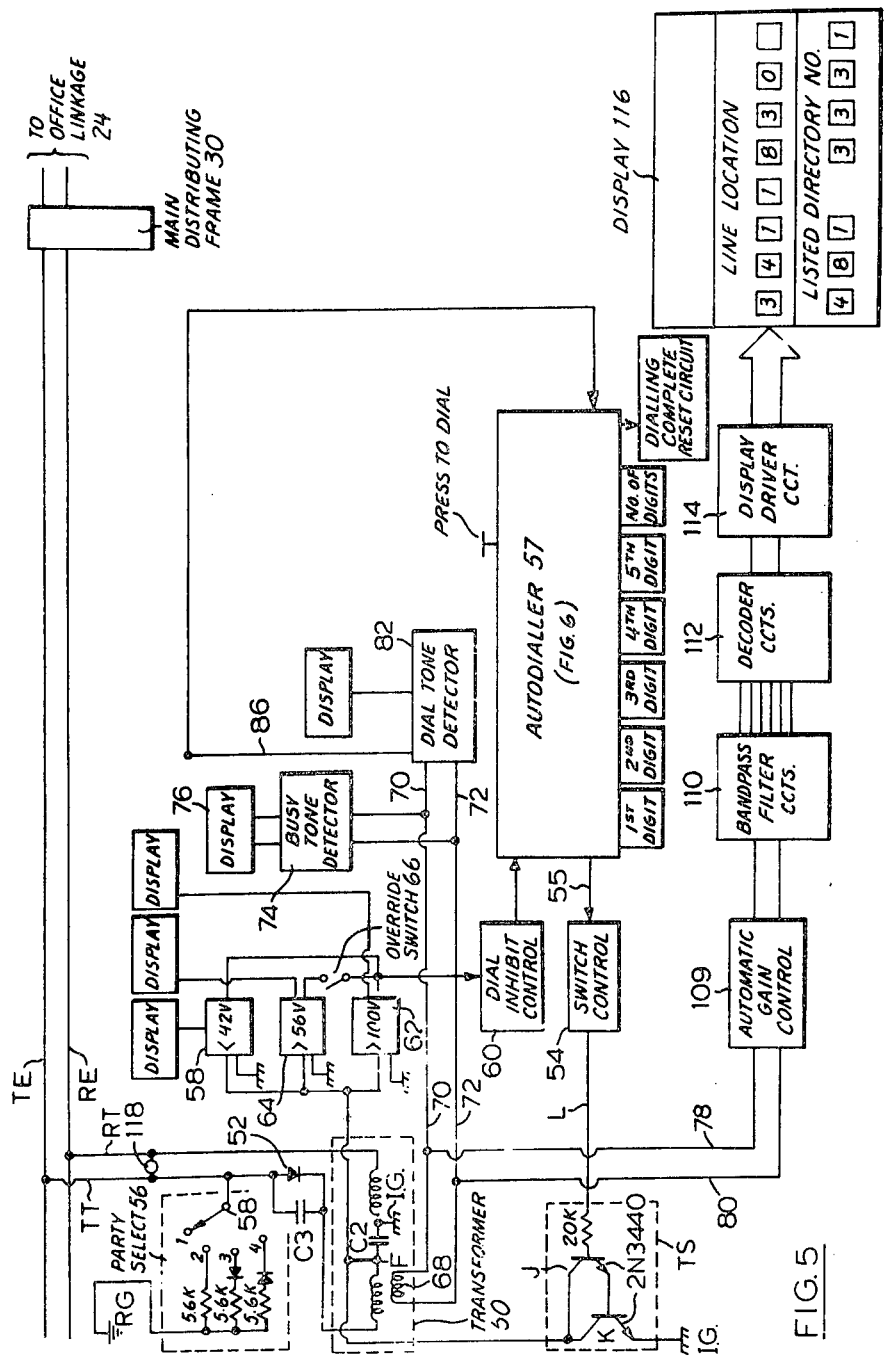

FIG. 5 shows the test set connected by lines TT and RT to a subscriber's line pairs TE and RE respectively, at A in FIG. 2. (The operation of the test set is the same if connected at B of FIG. 2). The tip lead TE of the subscriber's line pair is connected along TT through a diode rectifier 52 to one end of the primary of a transformer 60 with the diode poled to conduct from the lead TE toward the transformer primary. A condenser C3 is provided in parallel with the diode 52 to provide a full cycle A.C. bypass about the diode 52. The transfer primary is connected at its other end to the ring lead RE of the subscriber's line pair. Two parts of the primary winding of transformer 52 are intermediately connected across a condenser C2 as shown to provide an AC path through the primary but to prevent the flow of D.C. current therethrough. (The ground R.G. at the upper left of FIG. 5 is a "real ground" and is connected to the telephone office ground. The grounds I.G. and grounds using the same symbol are "instrument grounds" only and float with respect to real ground). A D.C. Path in parallel with condenser C2 (and therefore connecting the tip and ring leads TE and RE) is provided by connecting one side (the right in FIG. 5) of the condenser C2 to an instrument ground (thus providing a D.C. path for the tip and ring lead TE and RE) and the other side of the condenser C2 is connected through a transistor switch TS to such instrument ground. The transistor switch is designed to operate in a manner well known to those skilled in the art. A positive signal of predetermined amount turns on transistors J & K providing a closed connection from the left side of condenser C2 to ground while the absence of such positive signal of predetermined amount creates an open circuit across transistor K providing a break in the connection from the left side of C2 to ground. The break in the connection at transistor K appears to the subscriber's line pair TE - RE to which the test set 36 is connected, and to the telephone office equipment, exactly as the break in the pulsing contacts of a subscriber's hand set. Thus pulsing, in accord with the invention, is performed by the breaking of conduction in transistor K at the transistor switch TS.

Point F in the primary of transformer 50 is located on the opposite side of condenser C2 from the ground connection for C2. The C2 ground connection acts as a D.C. ground for condenser C2.

When transistor switch TS is open, the voltage from point F to instrument ground, therefore, represents the voltage across the lines TE - RE.

The state of transistor switch TS is determined by switch control 54 which is designed to send a signal over line L to cause switch TS to be open or closed Control 54 maintains switch TS conducting to indicate a loop closure across the subscriber's line TE and RE which are electrical extensions of the connected T and R lines in FIG. 2. Switch control 54 may be actuated (as hereinafter described) to close (connect for conduction across) switch TS by the press to dial switch 53 and may be actuated to open and to close switch TS by signals received along line 55.

As part of the test set, the 'party select' equipment 56 is shown. This comprises a rotary switch having its common terminal 58 connected to the su bscriber's line TE and four select terminals 1, 2, 3 and 4. The four select terminals respectively simulate the impedance and conduction conditions provided for classes of parties at the subscriber's sets. Thus terminallis unconnected, terminal 2 is connected to ground for conduction in both directions, through a 5.6K resistor, terminal 3 is connected for conduction only from lead TE toward ground through such resistor and terminal 4 is connected for conduction only from ground toward the line TE. The test set operator may thus set the select switch at the terminal desired and simulate any of the possible four parties who may share the subscriber's line pair. The result is that when the test code is dialled by the auto dialler 57, the telephone office, as it would on a normal call, performs the test to determine which party is making the call. With the test set of this invention the results of the telephone office tests are determined by the party select switch 58. Determination of the party allows the central office equipment to provide this information, along with the line location information, to the line location bins 14 (FIG. 2). From line location bins 14 this information, along with the other information in the bins, is supplied (in accord with the invention) through converter 37 to bins 15 for signalling back to the test set 36 and is also supplied to the translator 16 so that the ANI equipment may use the class of customer information to properly identify the subscriber's number. The party select circuitry 58 in the test set, therefore, allows unique identification of each of the parties on a 2, 3 and 4 party line when the parties are differentiated by the impedance connection of the tip line to ground.

Means are provided to inhibit the initiation of operation by auto dialler 57 in the event that the line voltage across the subscriber's pair TE, RE is less than 42 V.d.c. which is an indication that the customer is using the lines or that the lines are unconnected (or disconnected) at central office. A comparator or threshold device 58 is provided to determine whether the voltage at point F with respect to ground is less than 42 V.d.c. If so a signal is sent from device 58 to a Dial Inhibit Control 60 causing it to develop a signal operative to prevent the initiation of digit pulsing by autodialler 57 as hereinafter explained.

Means are similarly provided to inhibit the initiation of dialling by the test set in the event that line voltage across the subscriber's pair TE, RE is greater than 100 V.d.c. indicating an alarm or battery boosted pair. A comparator or threshold device determines whether the voltage between F and ground (between TE and RE) is over 100 volts and if so causes provision of a signal operative to prevent the initiation of digit pulsing by autodialler 57 as hereinafter explained.

Means are similarly provided to (optionally) inhibit the initiation of dialling by the test set in the event that line voltage across the subscriber's pair TE, RE is greater than 56 volts. Comparator or threshold device 64 determines this and, if override switch 66 is closed, prevents the initiation of digit pulsing by autodialler 57 as hereinafter explained. If it is desired to use the test set 36 for signals between 56 and 100 volts then override switch 66 is opened to prevent the signal from device 64 from reaching Dial Inhibit Control 60.

The devices 58, 64 and 62 will customarily be provided with corresponding displays.

The criteria for operation of devices 58, 64 and 62, of 42, 56 and 100 V.d.c. may of course each be varied to any other levels desired.

The alternating signals appearing across lines TE and RE are conducted across C2 and thus appear across the primary of transformer T, these signals appear at the secondary 68 of transformer T and are supplied along lines 70 and 72 to a busy tone detector 74, well known to those skilled in the art and connected, if busy tone is detected, to light a light or visual signal 76 to indicate to the operator of the test set, that the dialled circuitry is busy. The lines 70 and 72, as hereinafter described, are also connected to lines 78 and 80, respectively, which connect to automatic gain control 109 and through it to the means for receiving the tone pair signals from the connected sender 10 or 10M at the telephone office.

Lines 70 and 72 are also connected to a dial tone detector 82 which may be of conventional design and is equipped to provide an output or "actuate" signal on line 86 if dial tone is detected. If, as in the centrex option to be described, two different dial tones can appear across the lines, the detector 82 will be designed to detect either of these dial tones. The test set 36 will be designed for conventional or for 'Centrex' dialling. By 'Centrex' (also known as Private Branch Exchange (PBX) or prefix 9 dialling) is meant the system wherein the subscriber's line pair being tested belongs to a system where a first dial tone requires that the dialler dial a digit (usually 9) to get a second dial tone indicating connection to the conventional telephone office. The second dial tone will require him to dial the listed directory number (LDN) to reach his destination through the conventional telephone office. In the embodiment shown, conventional and 'Centrex' options are included selected by the position of ganged switches 121–121A (FIG. 6).

The operation of the Auto dialler will now be described.

Figure 6:
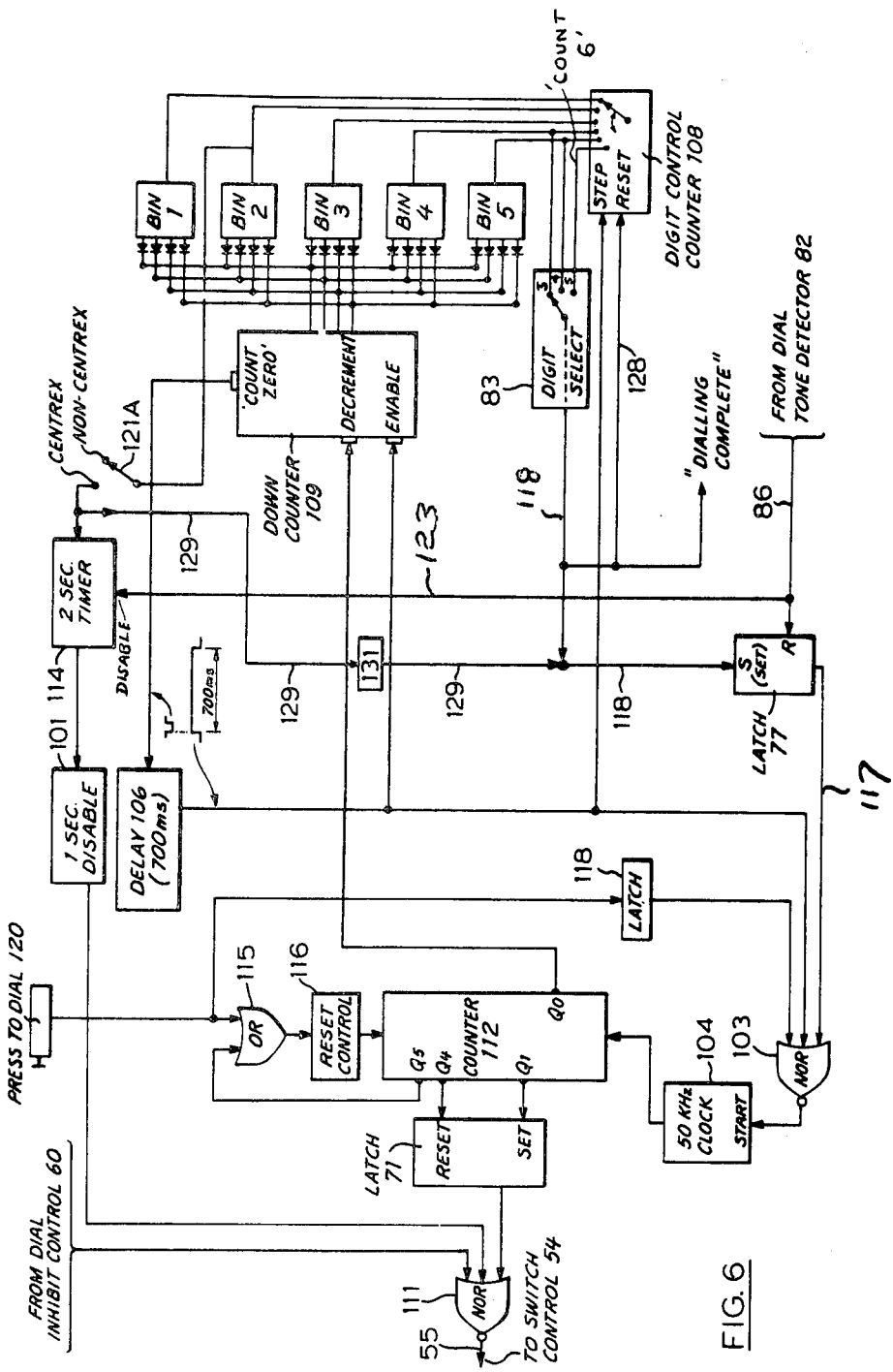

The description of FIGS. 5 and 6 is partially schematic and explains the arrangement and operation of the invention to those skilled in the art. Routine wiring, power supplies, reset circuitry all obvious to those skilled in the art is omitted for clarity.

In FIG. 6 is shown an octal counter 112 designed to reset to Q0 output at Q5 so that equal intervals are clocked to outputs Q0–Q5 in the sequence Q0, Q1, Q2, Q3, Q4, Q5, Q0, Q1, etc. The octal counter is designed to reset latch 71 at Q4 to operate switch control 54 to close switch TS, and to set latch 71 to cause switch control 54 to open TS at Q1. The counter is actuated by a 50 Hz clock, 104 i.e. having a period of 20 milliseconds. Thus the interval Q1–Q4 gives a 'break' or open connection for switch TS of 60 ms and a 'make' Q4–Q1 (TS closed or connected) of 40 ms, the former period being the pulsing break for digital break for digital pulsing by TS. The number of 'breaks' is equal to the digit outpulsed except, as in conventional telephone signalling, ten 'breaks' represents 0. When a rest or reset counter 112 is at Q0 so that TS is closed and connecting TE and RE.

Operation of the press-to-dial switch 120 results in a reset signal to counter 112 through OR gate 115 and control 116 to reset the counter to Q0 and to operate latch 118 to send an enabling signal to NOR gate 103. However NOR gate 103 requires such an enabling signal on all its inputs before turning on clock 104. The 700 ms delay circuit 106 is designed to provide an enable signal to NOR gate 103 and to down counter 109 when not actuated and a disable signal to elements 103 and 109 of duration 700 ms when actuated. This disable signal is also used to step digit control counter 108 to energize the next digit bin. After the press-to-dial switch is pressed, the start of clock 104 awaits the enabling of lead 117 to the NOR gate 103 by latch 77. Latch 77 is connected to send its enable signal on line 117 on receipt at its reset terminal R of a signal from dial tone detector 82 that dial tone has been received. Lead 117 is provided by latch 77 with a disable signal when there is an input at the S terminal of latch 77 on line 118 from Digit select switch 83 or from line 129.

The press-to-dial switch 120 also enables the remaining circuitry shown to sequentially supply (such sequential supply is hereinafter discussed) to the downcounter 109 the value 0–9 which is manually set on each of the selected number of bins 1–5. The digit control counter 106 is stepped through connection to digit bins 1, 2, 3, etc. successively by signals from delay circuit 106 to successively energize the corresponding bins 1, 2, 3, etc. which results in the successive setting of their digit value in downcounter 109. The digit select switch 83 is connected to the energizing line from digit control counter 108 to the bin one higher than selected, i.e. if 3 digits are selected, the digit select switch is connected to the line from digit control counter 108 to bin 4, if 5 digits are selected an extra 'count 6' lead is provided to be energized by counter 108 even though there are only 5 bins. In the 'Centrex' option a switch 121A is closed connecting the line between counter 108 and bin 2 to the 2 second timer 114 and to line 129.

Downcounter 109 is designed to be decremented by 1 after completion of each cycle by reset from Q5 to Q0 at octal counter 112. Downcounter 109 is also designed, when it is decremented to count 0 to provide a pulse to actuate delay circuit 106. Delay circuit 106 is designed on receipt of this signal to provide a 700 ms disable signal to NOR gate 103 and to the 'enable' terminal of downcounter 109. At the end of the 700 ms delay, the output of delay 106 again provides an enable signal to NOR gate 103, to downcounter 109, and this signal steps digit control counter 108 to energize the next bin line. Energization of the bin 2 line by digit control counter 108 (if the switch 121A is closed under Centrex option) actuates timer 114 to time a 2 second period and 'sets' (at S terminal) latch 77 to send a disable signal to NOR gate 103 to stop clock 104 and counter 112. If timer 114 times a 2 second period (i.e. if not disabled by a signal from dial tone detector 82) then at the end of the two second period timer 114 actuates timer 101 which provides a 1 second disable signal to NOR gate 111 and from it to switch control 54.

In operation when the test set is connected across lines TE-RE of the circuitry of FIG. 5 under the conventional (i.e. non-Centrex) setting, switch 121 is open. The values of the number of digits (here 3) are set in bins 1, 2 and 3. Thus digit select switch 83 is set to connect the line 118 to the line from counter 108 to bin 4 to send (when the latter line is energized) a disable signal to latch 77. Operation of the press-to-dial switch 120 enables the circuitry of FIG. 5. The digit control counter 108 provides the value of the first digit to be dialled to downcounter 109 by energizing counter 108's line to bin 1. Switch control 54 is disabled at NOR gate 111 by a disable signal from dial inhibit control 60, until the voltage checks are completed at comparison devices 58, 64 and 62, but the line to the NOR gate 111 from delay 101 is not disabled (delay 101 being inoperative at this time) and the line to gate 111 from latch 71 is enabled. Thus when the voltage conditions at elements 58, 64 and 62 are satisfied, the disable signal from control 60 is altered to an enable signal and NOR gate 111 is enabled on all inputs to actuate switch control 54 to close switch TS to actuate the telephone office to place dial tone on the line. Control 60 is designed to maintain its output enable signal until reset on termination of operation by the autodialler. Thus variations of voltage during operation of the autodialler do not result in a disable signal from control 60. Such dial tone is detected by detector 82 to provide a signal on line 86 to reset latch 77 causing it to send an enable signal to NOR gate 103. The other inputs to NOR gate 103 being already enabled the enable signal from latch 77 results in a signal from NOR gate 103 to start the clock 104. Clock 104 causes counter 112 to count successive cycles Q0 to Q5. In each cycle, Q1-Q4 is a pulsing break, communicated through elements 71, 111, 54 to open TS for the 'break' period. The reset from Q5 to Q0 results in a signal to decrement downcounter 109 by 1. Downcounter 109 was provided with the value of the first digit and is decremented by the completion of each cycle of counter 112 until the downcounter 109 reaches 0 at the same time as counter 112 operating through elements 71, 111 and 54 has pulsed the digit on lines TE, RE by 'breaks' in switch TS. When downcounter 109 reaches 0 it sends a pulse to 700 ms delay circuit 106. This results in a 700 ms disable signal to NOR gate 103 and removal of the enable signal to downcounter 109. The disable signal from delay 106 is used to actuate digit control counter 108 to connect to the second digit bin. The 700 ms disable signal at NOR gate 103 disables clock 104 and counter 112 (at position Q0) for the same period. Since the counter 112 is disabled at Q0 for the same period the elements 71, 111 and 54 maintain switch TS closed for the same period, thus providing the 700 ms interdigital pause to the telephone office. At the end of 700 ms delay 106 again sends an enable signal to NOR gate 103 starting clock 104 and counter 112.

Downcounter 109 is now loaded with the second digit. The clock 104 and counter 112 provide the number of 'breaks' at switch TS corresponding to the second digit loaded on downcounter 109. When this number of 'breaks' has been completed, downcounter 109 has been decremented to 0 and actuates delay 106 to provide the second interdigital pause. The process is repeated for the third digit. In the example given, three digits were to be sent. When the third digit has been sent and the 700 ms delay thereafter initiated, the resulting disable signal from delay 106 sets digit control counter 108 to the line to bin 4. The digit select switch 83 was set to connect to this line and acts to 'set' latch 77. Latch 77 'set' provides a disable signal to NOR gate 103. This causes NOR gate 103 to disable the clock 104 and counter 112. The connection to lines 118-128 from switch 83 provides the disable signal to Digit control counter 108 where it is used to reset this counter. The signal from switch 83 on line 118 is used as a 'dialling complete' signal, as indicated in FIG. 6, to set the autodialler circuitry in general. The reset circuitry is not shown but is well known to those skilled in the art. Disabling of clock 104 by latch 77 leaves clock at Q0 so that latch 71 and NOR gate 111 maintain an enable signal to control 54 maintaining switch TS closed to maintain the loop closed at the telephone office which will now send information to the test set (as previously described) in multi-frequency tones.

Under the Centrex option, switch 121A will be closed. The first digit (in bin 1) will be 9. This will be sent as described in connection with the conventional circuitry. However when the line from counter 108 to bin 2 is energized by the initiation of the first interdigital pause (by delay 106) the line to bin 2 is now connected by switch 121A to delay 114 to initiate a 2 second timed interval. Initiation of the pause by delay 106 causes it disable signal to switch counter 108 to the second line. Energization of the line to bin 2 sends across switch 121A a signal on line 129 through block 131 to set latch 77 to cause it to produce a disable signal for NOR 103. The resultant disable signal from latch 77 to NOR gate 103 disables clock 104 and counter 112 until new dial tone is received. The block 131 is merely included in line 129 to indicate a device to transform the signal on the bin 2 line into a signal of the necessary form to set latch 77. The counter 112 is disabled at Q0 so TS is then closed and the telephone office is then connected. The circuitry to which TE-RE are connected at this time may be 'Centrex' office or a normal telephone office.

1. If a Centrex office, a second dial tone is obtained from the conventional telephone office by the dialling of the 9, in less than 2 seconds. This is detected by detector 82. Detector 82 then disables and resets timer 114 along line 123 and resets latch 77. Resetting latch 77 enables clock 104 and counter 112 to pulse the second digit, already loaded in downcounter 109. The pulsing will be completed as described in the conventional arrangement previously described. The second and succeeding digits will comprise the special code required to cause the conventional telephone office to connect a dedicated trunk 26D and perform the operations previously described.

2. If a normal central office is connected the 'dialling' of the first '9' digit, with switch 121A closed, will not provide a second dial tone. There will thus be no disable signal for timer 114 which will time for two seconds with clock 104 and counter 112 off and TS closed. At the end of two seconds timer 114 will activate timer 101 to send a disable signal to NOR gate 111 for an interval of 1 second. This disconnects switch TS for 1 second appearing to the telephone office like a disconnect i.e. signalling disconnection. (It will be noted that the autodialler circuitry does not reset during this 1 second interval). At the end of one second the disable signal from delay 101 is removed by timer 101 at NOR gate 111, switch TS recloses signalling a connection to the central office and the telephone office newly seizes the line TE-RE and sends new dial tone thereto. This is detected at detector 82 which resets latch 77 reenabling clock 104 and counter 108. Downcounter 109 is already set at the second digit. The operation of counter 112, downcounter 109 and 700 ms delay circuit 106 causes pulsing of the remaining digits as previously described. These comprise the special access code required by the telephone office and cause it to connect to a dedicated trunk 26D and to operate as previously described. The first digit '9' has no effect on the operation as it was treated by the conventional telephone office as part of a previous call. The pulsing of the last digit resets the circuitry as previously described. The closed switch TS and the circuitry (under both Centrex and non-Centrex options) await the multi-frequency information from the telephone office.

In the operation so far as conventional dialling is concerned, the operator of the test set connects his equipment across a subscriber's line pair, here the lines TE and RE. Switch 121A is in the 'non-Centrex' position. Transistor switch TS is then open. If the bridged lines TE and RE are busy, the threshold device (<42 V.d.c.) will also inhibit any attempt at pulsing. Similarly if the display lights corresponding to the <42 V.d.c. or >100 V.d.c. signals the test man will note this from the corresponding displays and will not attempt to further dial (and will be prohibited from dialling). If the >56 V.d.c. display lights (without the >100 V. display) then the test operator knows that he may proceed by opening the override switch 66.

If the test set operator attempts to proceed with the operation of the set when the voltage is over 100 V.d.c. over 56 V.d.c. (without override) or under 42 V.d.c., the inhibit signal to the switch control 54 from dial inhibit control 60 prevents operation of the switch control 54 by the press to dial button. The existence of an inhibit signal from dial inhibit control 60 thus prevents closure of transistor switch TS. If none of the above conditions prevent operation, there is no inhibit signal from Dial Inhibit Control 60, none of the displays corresponding to devices 58, 64 or 62 are lit, the test man presses the press-to-dial switch. The actuation of the press-to-dial switch causes the switch control to close transistor switch TS completing a loop across lines TE and RE which causes the telephone office to put dial tone on the line. Dial tone on the line is detected by detector 82 and results in an actuate signal being sent over line 86, which actuates the auto dialler to operate switch control 54 to cause the predetermined special access code operating switch control 54 to sequentially open and close switch TS to place the special access code on the lines TE-RE to the central office in the form of dial pulses.

(The handling of the signals from the central office to test set 36 will be discussed after description of the 'Centrex' option for autodialling).

In the 'Centrex' option switch 121A is placed in the 'Centrex' position. The actuate signal resulting from dial tone detection on line 86 is provided to operate the autodialler as previously described.

Under the 'Centrex' option the test set will either (1) if the bridged lines TE and RE are connected to a 'Centrex' system dial 9 on receipt of the first dial tone to reach the conventional telephone office and then, after receipt of the conventional office dial tone, provide the special access code to the conventional telephone office, (2) if the bridged TE and RE lines are not connected to a 'Centrex' system, the test set will dial '9' on receipt of dial tone, then determine from the failure to receive new dial tone within a predetermined period (timer 114) that the system is not 'Centrex', disconnecting at switch TS long enough (timer 101) to get fresh dial tone from the central office, then dialling the programmed digits following the 9 which to provide the special access code to the conventional telephone office.

It is noted that, when the test set has provided over lines TE, RE the special access code to the office linkage 24, the common equipment 22 causes the operation of the circuitry of FIGS. 2–4 to take place as earlier described, resulting in the trnasmission of numerical information in tone pairs to lines TE, RE.

It is now proposed to discuss briefly the equipment for display of the numerical information received from the central office in tone pairs.

In FIG. 5 the secondary 68 of transformer T is connected to lines 70 and 72 which are respectively connected to lines 78 and 80 as described. The tone pairs received from the central office are provided on lines TT and RT and on RT the whole cycle of the AC tone signals bypass the diode 52 on condenser C3 and appear across the transformer T primary. These tones are supplied by transformer secondary 68 to lines 78 and 80. Lines 73 and 80 are connected through Automatic Gain Control 109 to a system of Filters 110 to segregate the components of the tone pairs according to frequency and thereafter they will be decoded, in decoder 112, into the digits represented by the tone pairs. The digits determined in decoder 112 are supplied to display driver 114. The driver 114 drives display 116. The display may take any form and the form shown is only exemplary. The display digits will preferably be in the form of light emitting diodes which are low power and the display will preferably be battery operated to maintain its information after the test set is detached from lines TE and RE. The display will, most commonly, be included in a panel with the other controls and displays, including: the control for the Centrex dialling select switches 84, 84A, the press-to-dial switch 53 a "busy" light 76 operated by Busy Tone Detector 74 and lights corresponding to the voltage detections <42 V.d.c., >56 V.d.c. and >100 V.d.c. If desired, a voltmeter 118 may be connected between lines TT and RT to measure the voltage across the subscriber's line pair TE-RE with switch TS open.

The elements for converting the tone pairs received at transformer secondary 68 into the display 116, i.e. Automatic Gain Control 109, Bandpass filter circuits 110 Decoder 112, Display driver circuit 114 and display 116 all use techniques both easily available and well known to those skilled in the art and many alternatives are available.

To very briefly review the operation elsewhere described, test set 36 (FIG. 5) is connected across the lines TE-RE and as shown on the subscriber's line pair in FIG. 2. On actuation of press-to-dial switch 120 the set 36 determines that the line pair TE-RE is not busy and has a voltage of between 42-56 V.d.c. (which limits may of course be varied as desired) or between 42-100 V.d.c. which may also be varied as desired. If the voltage conditions are not outside such design limits the test set 36, operates switch TS to close a loop at the telephone office which then sends dial tone to lines TE-RE. Reception of dial tone by the test set 36 initiates, either with conventional or Centrex dialling, completed by the provision by the auto dialler 57, (by control of switch TS) of dial type pulses to the telephone office of the special access code designed to reach the dedicated trunk 26D and a sender 10M or 10. If the line location information and class of party is to be sent in addition to the LDN to the test set the sender will be 10M and if the LDN only is to be sent the sender will be 10, all as discussed in connection with FIGS. 2-4. The telephone office equipment then operates as discussed in connection with FIGS. 2-4. The outgoing sender 10 or 10M sends the digital information in tone pairs which is decoded and displayed at display 116.

With regard to the specific disclosure of FIGS. 5 and 6 and with regard to the broader aspects of the invention of FIGS. 2-6, it is noted that it is considered within the scope of the invention to combine the circuitry described in connection with FIGS. 2-4 with a dialler and displays at the location of test set 36 even if the dialler is manually operated and operates an ordinary mechanical pulsing switch instead of solid state switch TS. Conversely it is within the scope of the invention to use a test set and display of the type of FIGS. 5 and 6 to determine calling numbers signalled from the central office in tones, even if the tones are provided other than by the circuitry of FIGS. 2-4.

We claim:
1. In a telephone switcher:
(a) having means, responsive to the presence of dialled type digits on a subscriber's line pair,
(b) for selecting a trunk circuit,
(c) for selecting a sender,
(d) for establishing a connection between the sender and said trunk,
(e) for establishing a connection between the subscriber's line pair and said trunk circuit,
(f) for providing to said sender information as to the line location of said subscriber's line pair,
(g) said sender being designed and constructed to store said information,
(h) means associated with said sender for converting said line location information into a telephone number identified therewith,
(i) said sender being designed responsive to a predetermined signal from said connected trunk circuit to supply to said trunk circuit tone signals carrying the information as to said telephone number,
(j) means operative during the supply of said number from said sender to said trunk circuit for providing a disconnection in the connection between said trunk circuit and said subscriber's line pair,
the improvement comprising:
a trunk circuit modified to provide an alternating circuit bypass about said disconnection for said tone signals, means associated with said trunk circuit for providing from said modified trunk circuit to a connected sender said predetermined signal, means responsive to the dialling of a predetermined access number on such subscriber's line pair: for causing connection of said subscriber's line pair and said modified trunk and for connecting the selected sender to said modified trunk.

2. In a device as claimed in claim 1 wherein at least one of said senders is modified to also convert such temporarily stored line location information into a format for supply as tone signals to a connected trunk circuit and said sender is designed in response to a first predetermined signal to supply to a connected trunk circuit tone signal representing said converted line location information and in response to a second predetermined signal to supply to said trunk circuit such tones carrying the information as to said telephone number, and wherein said means associated with said trunk circuit is designed to provide to a connected sender said first followed by said second predetermined signal, and wherein said means responsive to the dialling of a predetermined access number is designed to select such a modified sender for connection to said modified trunk.

3. In a telephone switcher,
having means, responsive to an off-hook condition across a subscriber's pair of lines and the provision of dialled digits across the subscriber's pair of lines, for providing connection of the subscriber's pair of lines to a selected one of a group of trunk circuits,
means for providing to said selected trunk circuit, from a sender connected to said trunk circuit at a connecting point, audio frequency tones representative of the called number and of the number of the calling party,
means for providing an interruption in the connection between said connecting point and said subscriber's pair of lines during the provision of said audio tones,
the improvement comprising:
providing at least one trunk circuit having a connection for such audio frequency tones from said connecting point to said subscriber's lines, providing an alternating current bypass about said interruption, and
means, responsive to the provision of a predetermined set of dialled digits across such a pair of subscriber's lines for selecting said at least one trunk.

4. In a telephone office, having subscriber's line pairs and outgoing lines, and means responsive to the presence of one of a number of predetermined sequences of dialled type digits on a subscriber's line pair, for completing connections represented by said one sequence, sender means responsive to said presence and responsive to a signal to provide, in audio frequency tones, signals identifying the telephone number corresponding to said subscriber's line pair; the improvement comprising:

circuit means, responsive to the presence of a predetermined sequence of dialled digits on said subscriber's line pair for establishing a connection between said sender means and said subscriber's line pair and for providing such signal to said sender whereby said audio frequency tones are supplied to said subscriber's line pair.

5. In a telephone office:
(a) having means responsive to the presence of one of a number of predetermined sequences of digits on a subscriber's line pair,
for selecting a trunk circuit,
for selecting a sender,
for establishing a connection between the selected sender and the selected trunk circuit,
for establishing a connection between the subscriber's line pair and said trunk,
for providing to said sender information as to the line location of said subscriber's line pair,
first storage means, associated with said sender, for storing said line location information,
means connected with said sender for converting said stored line location information into a telephone number identified therewith,
said sender being provided with second storage means, and being designed, responsive to a signal to provide to a connected trunk predetermined audio tones carrying the numerical information in said second storage means,
means operative during the supply of said number from said sender to said connection, for providing an interruption in the connection in such trunk to said subscriber's line pair,
the improvement comprising:
at least one trunk modified to provide an alternating current connection bypassing said interruption between said modified trunk and such subscriber's line pair,
at least one sender modified to provide means for transferring line location information stored in said first storage means into said second storage means,
means responsive to the dialling of a predetermined access number on a subscriber's line pair for causing connection of such a modified trunk circuit to said subscriber's line pair and to such a modified sender and for providing the line location information corresponding to said subscriber's line pair from said first to said second storage means whereby, upon provision of a first signal to said sender, said sender will transmit said line location information from said first storage, over said modified trunk circuit to said subscriber's line pair,
means responsive to a second signal for converting the signal stored in said first storage means into the telephone number identified therewith, supplying said telephone number to said second storage bins and causing said sender to transmit said number as audio tones over said trunk to said subscriber's line pair.

6. In a telephone switcher, having subscriber's line pairs and outgoing lines, and means responsive to the presence of one of a number of predetermined sequences of dialled digits on a subscriber's line pair, for completing the connections represented by said one sequence, means for storing the line location information corresponding to said subscriber's line pair, sender means responsible to a first signal for transmitting digits from such one sequence to an outgoing line, in the form of audio frequency tones, means for converting said line location information into a sequence of digits identifying the telephone number corresponding to said subscriber's line pair, said sender means being responsive to a second signal for transmitting digits, in the form of audio frequency tones, to an outgoing line, the improvement comprising:

circuit means, responsive to the presence of a predetermined sequence of digits across a subscriber line pair for establishing a connection between said sender means and said subscriber's line pair,
means responsive to the presence of said predetermined sequence of digits for providing said line location information to said sender and for providing, in response to said first signal, audio tones signalling said line location information to said subscriber's line pair,
and means responsive to the presence of said predetermined sequence of digits for causing said sender to transmit the said telephone number to said subscriber's line pair.

7. Telephone equipment, comprising:
(a) test means for connection to a subscriber's line pair
(b) said test means including:
(c) means for providing a predetermined sequence of dialled type digits to said subscriber's line pair,
(d) means for detecting audio frequency tones appearing on said subscriber's line pair,
(e) a telephone office designed to provide connection for said subscriber's line pair in response to dial type signals appearing thereon and designed to provide information identifying said subscriber's line pair;
(f) such telephone office including:
(g) means responsive to the provision of said predetermined sequence of dialled type digits to provide to said subscriber's line pair such audio frequent tones identifying said subscriber's line pair.

8. Means as claimed in claim 7 wherein said test means includes,
means responsive to a voltage across said subscriber's line pair below a predetermined value for preventing provision of dialled type digits by said test means.

9. Means as claimed in claim 7 wherein said test means includes,
means responsive to a voltage across said subscriber's line pair above a predetermined value for preventing provision of dialled type digits by said test means.

10. Telephone equipment as claimed in claim 7 wherein said test means includes:
means for completing a connection across said subscriber's line pair
means responsive to the presence of dial tone across said subscriber's line pair for causing said means to provide said sequence of digits.

11. Telephone equipment as claimed in claim 10 wherein said test set includes, means responsive to the initial presence of dial tone across said line pair to cause said means to provide the first digit in said sequence,
means consequent upon the provision of said first digit for delaying for a predetermined interval provision of the remainder of the digits in said sequence,
means for determining, during said predetermined interval, whether dial tone is received,
means responsive to the receipt of dial tone during said interval for causing the provision of the remainder of said sequence of dialled type digits;

means responsive to the completion of said interval without the reception of dial tone for disconnecting said connection for a period sufficient to be detected at said telephone office as a disconnection, means operable at the end of said period for reclosing said connection, means responsive to the reclosing of said connection and the receipt of dial tone thereafter for causing the provision of the remainder of said digits.

12. Telephone equipment as claimed in claim 10 wherein said digits are provided as pulse caused by temporary disconnection of said connection and wherein an interdigital pause is provided between the pulsing of successive digits during which said connection is closed.

13. Telephone equipment as claimed in claim 11 wherein said digits are provided as pulses caused by temporary disconnection of said connection and wherein said connection is closed during said interval after the pulsing of said first digit, and an interdigital pause is provided between successive digits pulsed thereafter during which said connection is closed.

14. Test means comprising:

a pair of leads operable to be connected to a subscriber's line pair, a switch designed when closed to provide a direct current connection across said subscriber's line pair, controls for opening and closing said switch operable to provide connect and disconnect conditions and pulsing breaks across said lines, means actuable to initially close said switch to actuate a telephone office to provide dial tone to said subscriber's lines, means for determining whether the voltage across said leads is higher than a predetermined value and means responsive to the determination to prevent initial closure of said switch while said voltage is higher than said predetermined value.

15. Test means comprising:

a pair of leads operable to be connected to a subscriber's line pair, a switch designed, when closed, to provide a direct current connection across said subscriber's line pair, controls for opening and closing said switch operable to provide connect and disconnect conditions and pulsing breaks across said lines, means actuable to initially close said switch to actuate a telephone office to provide dial tone to said subscriber's line, means for determining whether the voltage across said leads is lower than a predetermined value, and means responsive to the determination to prevent initial closure of said switch while said voltage is less than said predetermined value.

16. Test means comprising:

a pair of leads operable to be connected to a subscriber's line pair, a switch designed, when closed, to provide a direct current connection across said subscriber's line pair, controls for opening and closing said switch operable to provide connect and disconnect conditions and pulsing breaks across said lines, means actuable to initially close said switch to actuate a telephone office to provide dial tone to said subscriber's line, means for determining whether the voltage across said leads is outside a predetermined range, and means responsive to the determination to prevent initial closure of said switch while said voltage is less than a predetermined value.

17. In a telephone switcher, having subscriber's line pairs and outgoing lines, and means responsive to the presence of one of a number of predetermined sequences of dialled digits on a subscriber's line pair, for completing connections represented by said one sequence, sender means, means for providing to said sender means information identifying the digits of the telephone number corresponding to said subscriber's line pair, said sender means being responsive to a signal to provide, in audio frequency tones, signals identifying said telephone number; the improvement comprising:

circuit means, responsive to the presence of a predetermined sequence of dialled type digits being included in said number for establishing a connection between said sender means and said subscriber's line pair and thereafter for providing such signal to said sender whereby said audio frequency tones are supplied to said subscriber's line pair.

18. In a telephone switcher as claimed in claim 17 wherein said means for providing information identifying the telephone number to said sender includes means to provide line location information corresponding to said subscriber's line pair and means to convert said line location information into information identifying said telephone number, wherein means are also provided to supply to said sender said line location information and wherein said sender is designed, responsive to a first signal, to provide along said connection said line location information in audio tones and, responsive to a second signal to provide along said connection said information identifying said telephone number.

19. In a telephone switcher, having subscriber's line pairs and sender means; means, responsive to the presence of one of a number of predetermined sequences of dialled digits on a subscriber's line pair, for providing to said sender means, information identifying the telephone number corresponding to the subscriber's line pair, said sender means being responsive to a signal to provide, in audio frequency tones, signals identifying said telephone number;

means responsive to the presence of a predetermined sequence of dialled type digits, said last mentioned predetermined sequence being included in said number of predetermined sequences, for establishing a connection between said sender means and said subscriber's line pair; means responsive to said presence for providing said signal after the establishing of said connection, whereby said audio frequency tones are supplied to said subscriber's line pair.

20. In a telephone switcher as claimed in claim 19 wherein said means for providing information identifying the telephone number to said sender includes means to provide line location information corresponding to said subscriber's line pair and means to convert said line location information into information identifying said telephone number.

21. Automatic dialling equipment designed to provide on a telephone line pair a predetermined sequence of dialled type pulses comprising:

means responsive to receipt by said equipment of first dial tone, to provide to said line pair such pulses representing the first digit of said sequence, means to delay the provision of subsequent digits pending receipt of a second dial tone, and operable to cause provision of such subsequent digits on receipt of such second dial tone, means responsive to the absence, for a predetermined interval, of second dial tone after provision of said first digit to indicate a disconnect on the subscriber's line pair, and thereafter to indicate a reconnection on said pair, said means operable to cause provision of such subsequent digits being operable by a second dial tone resulting from pulses representing said first digit or by a second dial tone resulting from such reconnections.

22. Test means for connection to a subscriber's line pair of wires, comprising:

a pair of electrical leads, each lead being connectible to one line of a subscriber's line pair, switch control means for controllably opening and closing a switch between said pair of leads when connected to said subscriber's pair to simulate: on hook, off hook and pulsing conditions, dialling means responsive to the receipt of dial tone from said pair to said leads to cause said switch means to open and close said connection to produce dial type signals representing a predetermined sequence of digits, means in said test means designed and connected to detect tone signals of the type used on telephone lines to represent dialled digits, appearing across said subscriber's line pair, wherein said switch is open when said leads are connected to said lines of said line pair, means for measuring the voltage across said connected leads and means for preventing initiation of operation of said switch means if said voltage is above a predetermined amount.

23. Means as claimed in claim 22 wherein said switch is open when said leads are connected to said lines of said line pair, means for measuring the voltage across said connected leads and means for preventing initiation of operation of said switch means if said voltage is below a predetermined amount.

24. Test means for connection to a subscriber's line pair of wires, comprising:

a pair of electrical leads, each lead being connectible to one line of a subscriber's line pair, switch control means for controllably opening and closing a switch between said pair of leads when connected to said subscriber's pair to simulate: on hook, off hook and pulsing conditions, dialling means responsive to the receipt of dial tone from said pair to said leads to cause said switch means to open and close said connection to produce dial type signals representing a predetermined sequence of digits, means in said test means designed and connected to detect tone signals of the type used on telephone lines to represent dialled digits, appearing across said subscriber's line pair, wherein said switch is open when said leads are connected to said lines of said line pair, means for measuring the voltage across said connected leads and means for preventing initiation of operation of said switch means if said voltage is below a predetermined amount.

25. Test means comprising:

a pair of leads operable to be connected to a subscriber's line pair, a switch designed when closed to provide a direct current connection across said subscriber's line pair, a control for opening and closing said switch, means for setting digits to be provided in a predetermined sequence dialled type form by said test means to said subscriber's line pair, means actuable, with said leads connected to said subscriber's line pair, to cause closure of said switch across said line pair, means responsive to the receipt of dial tone across said leads to cause the opening and closing of said switch to provide dialled type digits in said predetermined sequence in form to be selected at a telephone office, wherein said means for causing operation of said switch is designed to pause after provision of the first digit, means for timing up to a predetermined interval after provision of said first digit, means for maintaining said switch closed during the timing of said interval, means responsive to the receipt of dial tone within said interval, to cause operation of said switch to provide the remainder of said sequence of dialled type digits, means responsive to the completion of said time interval without receipt of dial tone during timing for opening said switch sufficiently to indicate a disconnect to a connected central office, then reclose said switch, means responsive to the receipt of dial tone within said interval to cause the operation of said switch to provide the remainder of said sequence of dialled type digits.

26. Test means for connection to a subscriber's line pair of wires, comprising:

a pair of electrical leads, each lead being connectible to one line of a subscriber's line pair, switch control means for controllably opening and closing a switch between said pair of leads when connected to said subscriber's pair to simulate: on hook, off hook and pulsing conditions, dialling means responsive to the receipt of dial tone from said pair to said leads to cause said switch means to open and close said connection to produce dial type signals representing a predetermined sequence of digits, means in said test means designed and connected to detect tone signals of the type used on telephone lines to represent dialled digits, appearing across said subscriber's line pair, including means, operating after the production of dial type signals representing the first digit of said predetermined sequence to delay operation of said dialling means with said switch means closed, means for timing a predetermined period, means responsive to receipt of second dial tone within said predetermined period to cause said dialling means to produce dial type signals representing the remaining digits of said sequence, means responsive to the completion of said predetermined period without receipt of dial tone, to cause said switch means to open for a period long enough to cause disconnection of a connected telephone office from the subscriber's line pair, and to cause said switch means to reclose thereafter, means responsive to receipt of dial tone after said reclosure, to cause said dialling means to produce dial type signals representing the remaining digits of said sequence.

27. Test means for connection to a subscriber's line pair of wires, comprising:

a pair of electrical leads, each lead being connectible to one line of a subscriber's line pair, switch control means for controllably opening and closing a switch between said pair of leads when connected to said subscriber's pair to simulate: on hook, off hook and pulsing conditions, dialling means responsive to the receipt of dial tone from said pair to said leads to cause said switch means to open and close said connection to produce dial type signals representing a predetermined sequence of digits, means in said test means designed and connected to detect tone signals of the type used on telephone lines to represent dialled digits, appearing across said subscriber's line pair, wherein said switch is open when said leads are connected to said lines of said line pair, means for measuring the voltage across said connected leads and means for preventing initiation of operation of said switch means if said voltage is above a predetermined amount.

28. Means as claimed in claim 27 wherein said switch is open when said leads are connected to said lines of said line pair, means for measuring the voltage across said connected leads and means for preventing initiation of operation of said switch means if said voltage is below a predetermined amount.

29. Test means for connection to a subscriber's line pair of wires, comprising:

a pair of electrical leads, each lead bein connectible to one line of a subscriber's line pair, switch control means for controllably opening and closing a switch between said pair of leads when connected to said subscriber's pair to simulate: on hook, off hook and pulsing conditions, dialling means responsive to the receipt of dial tone from said pair to said leads to cause said switch means to open and close said connection to produce dial type signals representing a predetermined sequence of digits, means in said test means designed and connected to detect tone signals of the type used on telephone lines to represent dialled digits, appearing across said subscriber's line pair, wherein said switch is open when said leads are connected to said lines of said line pair, means for measuring the voltage across said connected leads and means for preventing initiation of operation of said switch means if said voltage is below a predetermined amount.

* * * * *